US007257105B2

(12) United States Patent
Molteni et al.

(10) Patent No.: US 7,257,105 B2
(45) Date of Patent: Aug. 14, 2007

(54) L2 METHOD FOR A WIRELESS STATION TO LOCATE AND ASSOCIATE WITH A WIRELESS NETWORK IN COMMUNICATION WITH A MOBILE IP AGENT

(75) Inventors: Marco Molteni, Antibes (FR); Massimo G Lucchina, Villeneuve Loubet (FR); Pascal Thubert, Lo Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 1162 days.

(21) Appl. No.: 10/263,632

(22) Filed: Oct. 3, 2002

(65) Prior Publication Data

US 2004/0066757 A1 Apr. 8, 2004

(51) Int. Cl.
*H04Q 7/20* (2006.01)
(52) U.S. Cl. ...................... 370/338; 370/469
(58) Field of Classification Search ................ 370/328, 370/338, 469
See application file for complete search history.

(56) References Cited

U.S. PATENT DOCUMENTS

| 5,845,265 | A | 12/1998 | Woolston | 705/37 |
| 5,907,544 | A | 5/1999 | Rypinski | 370/337 |
| 6,195,705 | B1 | 2/2001 | Leung | 709/245 |

(Continued)

FOREIGN PATENT DOCUMENTS

| WO | WO/01/37517 A2 | 5/2001 |
| WO | WO/02/25506 A1 | 3/2002 |

OTHER PUBLICATIONS

C.E. Perkins, Tutorial: Mobile IP, "Nomadicity: How Mobility Will Affect the Protocol Stack", *IEEE Internet Computing Online*, 1997. Available on http://www.computer.org/internet/v2n1/nomad.htm.

(Continued)

*Primary Examiner*—Melvin Marcelo
(74) *Attorney, Agent, or Firm*—Dov Rosenfeld; Inventek

(57) ABSTRACT

A wireless station having a wireless network device capable of providing a link-layer interface to a wireless network, a method operating at the link layer (L2) in the wireless station, and a carrier medium carrying computer readable code segments that when executed on a processor in the wireless station implement the method. The method includes, prior to the station being associated with a wireless network, wirelessly receiving L2 frames transmitted from one or more wireless access point of one or more wireless networks that the station can hear. The method further includes gathering information about the received L2 frames, including L2 information and L3 information. The L3 information includes whether an AP is sending an IP packet from a mobility agent, such that the station may associate with a wireless network that is in communication with the mobility agent. The method further includes storing information about the wireless networks that the station can hear in a database. The information stored about each wireless network includes one or more of an identifier of the wireless network, the L3 information in the L2 frame received from the AP of the wireless network, a time stamp of when the L2 frame was received from the AP, and an indication of the signal strength of the L2 frame from the AP.

108 Claims, 6 Drawing Sheets

U.S. PATENT DOCUMENTS

| | | | |
|---|---|---|---|
| 6,243,581 B1 | 6/2001 | Jawanda | 455/432 |
| 6,269,099 B1 | 7/2001 | Borella et al. | 370/389 |
| 6,272,129 B1 | 8/2001 | Dynarski et al. | 370/356 |
| 6,320,873 B1 | 11/2001 | Nevo et al. | 370/466 |
| 6,421,339 B1 | 7/2002 | Thomas | 370/352 |
| 6,421,714 B1 | 7/2002 | Rai et al. | 709/217 |
| 6,424,639 B1 | 7/2002 | Lioy et al. | 370/338 |
| 6,434,134 B1 | 8/2002 | La Porta et al. | 370/338 |
| 6,496,704 B2* | 12/2002 | Yuan | 455/466 |
| 6,625,135 B1 | 9/2003 | Johnson et al. | 370/332 |
| 6,810,428 B1 | 10/2004 | Larsen et al. | 709/238 |
| 7,089,014 B2 | 8/2006 | Brown et al. | 455/450 |
| 7,120,138 B2 | 10/2006 | Soomro et al. | 370/343 |
| 2001/0036834 A1 | 11/2001 | Das et al. | 455/458 |
| 2001/0046223 A1 | 11/2001 | Malki et al. | 370/338 |
| 2002/0026527 A1 | 2/2002 | Das et al. | 709/245 |
| 2002/0078238 A1 | 6/2002 | Troxel et al. | 709/245 |
| 2003/0087646 A1* | 5/2003 | Funato et al. | 455/456 |
| 2004/0066759 A1* | 4/2004 | Molteni et al. | 370/329 |
| 2004/0218573 A1* | 11/2004 | Takahashi et al. | 370/338 |
| 2005/0047372 A1* | 3/2005 | Yano et al. | 370/331 |
| 2005/0094641 A1* | 5/2005 | Yun et al. | 370/395.2 |
| 2005/0101321 A1* | 5/2005 | Ikeda et al. | 455/435.1 |

OTHER PUBLICATIONS

C.E. Perkins, Tutorial: Mobile IP, "Mobile Networking Terminology", *IEEE Internet Computing Online*, 1997. Available on http://www.computer.org/internet/v2n1/terms.htm.

C.E. Perkins, Tutorial: Mobile IP, "Mobile Networking Through Mobile IP", *IEEE Internet Computing Online*, 1997. Available on http://www.computer.org/internet/v2n1/perkins.htm.

Internet-draft: D.B. Johnson and C. Perkins, "Mobility Support in Ipv6", *IETF Mobile IP Working Group*, Mar. 22, 2002.

"Using Cisco Service Assurance Agent and Internetwork Performance Monitor to Manage Quality of Service in Voice over IP Networks", Cisco Systems, Inc., San Jose, CA, May 2002.

* cited by examiner

L2 METHOD FOR A WIRELESS STATION TO LOCATE AND ASSOCIATE WITH A WIRELESS NETWORK IN COMMUNICATION WITH A MOBILE IP AGENT

BACKGROUND OF THE INVENTION

1. Field of the Invention

The present invention relates generally to communication networks, and in particular to a wireless station of a wireless data network finding at L2 one or more access points that are in communication with a mobility agent, such that the wireless station can associate with such an access point to enable Mobile IP services.

2. Background

Wireless networks such as wireless local area networks (WLANs) are known. In a WLAN, stations are able to communicate wirelessly within a local network. In an infrastructure network, all communication is via an access point that acts as a base station. Any entity on the WLAN can also communicate with a node on any other wired or wireless network that is connected to the WLAN, e.g., via the access point.

Mobile IP is a well known extension of the Internet Protocol (IP) that enables a node on an IP-based network to change its physical attachment point in the network, e.g., the Internet, while retaining the same IP address by which it is identified on its home network. Agents providing Mobile IP services send IP packets that include advertisements of the services they provide. Thus, determining IP services is a process that occurs at L3 of the communication protocol.

While WLANs typically enable a wireless node to move from place to place within a small area, e.g., at a LAN level, without disrupting communications, mobile IP provides IP address mobility across a global network such as the Internet.

A station in a WLAN is not guaranteed to function seamlessly as Mobile IP node. In particular, a prior art wireless station associates with an access point at L2. Because the availability of IP services is determined at L3, prior art wireless stations do not function seamlessly with Mobile IP.

It is desired for a station on a WLAN also to be able to communicate using Mobile IP. In particular, it is desired for the wireless station to determine what IP services, if any, are available to access points prior to attaching to an access point.

The following discussion provides a brief overview of Mobile IP and wireless LANs, including definitions. A review of the need for the invention follows the discussion.

Mobile IP

The purpose of Mobile IP is to enable a mobile node to retain its home IP address even when it is away from its home subnetwork of an overall network such as the Internet. This is accomplished by the addition of a mobility agent, a router known in MIPv4 as a foreign agent, that provides the node with a "care-of" address for the mobile node. MIPv6 provides a slightly different mechanism. The care-of address is part of the IP packet itself, so that foreign agents are not required. The mobile node's home network similarly adds a mobility agent, in this case a router known as a home agent, which forwards IP packets addresses to the mobile node's IP address to the node's care-of address on the foreign network.

When a MIPv4 mobile node determines that it is not attached to its home network, it listens for router advertisements from a foreign agent. Such foreign agent advertisements contain one or more care-of addresses. After obtaining a care-of address, the mobile node then registers with the foreign agent, and subsequently, registers the care-of address with its home agent. Once these registrations are complete, the home agent intercepts IP packets containing the IP address of the mobile node and forwards them, via an IP tunnel, to the care-of address. When these IP packets reach the foreign network, the foreign agent redirects them to the mobile IP node at its care-of address. Thus the foreign agent removes them from the tunnel and the home agent together act as proxies for the mobile node's IP address, routing inbound and outbound traffic to and from the mobile node using its home IP address. When a mobile note again changes its attachment point to the Internet, it locates a new foreign agent, obtains a new care-of address, and re-registers with its home agent.

Note that the providing of Mobile IP services by foreign agents and home agents uses IP packets, and thus occurs at the network layer (layer-3).

According to RFC 3344, there is only one active care-of address for each foreign agent or access router, and therefore a single reverse tunnel to the Home Agent needs to be set up.

Wireless LANs

WLANs conform to one or more known protocols, such as the various versions of the IEEE 802.11 standard. An infrastructure WLAN includes an access point (AP) to act as a base station in the WLAN so that any wireless communication between stations in the WLAN occurs via the AP. Typically, the AP is connected to a wired network such as a LAN which in turn may be connected to a wide area network (WAN) such as the Internet. Any station in the WLAN can thus communicate with both the wired LAN or WAN via the AP.

According to the IEEE 802.11 standards, a station attempts to associate with an AP by scanning in "RF monitor mode" for signals, known as "beacon signals," that periodically originate from an AP. Beacon signals, in addition to other functions, serve to uniquely identify the AP within the WLAN. When a station detects a beacon, it switches into send-receive mode and executes an association protocol with the AP. At the successful end of the association protocol, the station is said to be associated with the AP.

Once a station associates with an AP, the AP is responsible for delivering network traffic to the station (and other associated stations). While an AP may associate with multiple stations, a station may associate with only one AP at a time, even though there may be more than one AP that the station can physically communicate with. When an associated station loses communication with its AP, the station must re-associate, either with a different AP, or the same AP.

The association between a station and an AP is initiated by a station, not an AP. After receiving one or more beacon signals, the station selects an AP it can communicate with, e.g., after receiving a beacon signal, and begins the association protocol. The criteria for a station selecting one AP over another is not specified in the IEEE 802.11 standard, but in practice, at minimum it is based on the quality of the wireless signal from the available APs. As previously noted, once associated, the station does not directly wirelessly communicate with any station not associated with its AP.

Note that the associating of a station with an AP occurs at the link layer (layer-2) of the protocol. In contrast, the providing of Mobile IP services by foreign agents and home agents uses IP packets, and thus occurs at the network layer (layer-3). Because the association procedure occurs at a lower protocol layer than Mobile IP services, the association between an AP and a station occurs at a protocol layer wherein there is ignorance of Mobile IP services, and thus occurs without regard to whether the AP is in communication with any mobility agents.

Therefore, there is a need in the art for a method and apparatus that enables a station of a WLAN to discover, prior to association, whether one or more candidate APs for association that are in communication with Mobile IP agents, e.g. with home agents and/or foreign agents. There also is a need subsequently to select for association one of the APs in communication with a mobility agent so that the wireless station can benefit from and/or provide Mobile IP services.

Definitions

Some of the following definitions are applicable to a wireless local area network (WLAN) that conforms to one of the IEEE 802.11 standards. Other WLAN standards exist and future ones may be developed. The present invention is not restricted to working with IEEE 802.11 conforming networks.

Access Point (AP): In the IEEE 802.11 standards, an AP is a wireless base station through which communication is managed in an infrastructure network (see BSS). An AP may be in communication with other wired or wireless networks. When compared to functions in a wired network, it is analogous to an Ethernet hub with optional access control to other networks.

Access Router: A router that provides access between two or more networks, for example, between a WLAN and a LAN, or between a LAN and the Internet. See also Mobility Agent.

Ad Hoc Network: See IBBS.

Association: In the IEEE 802.11 standards, association is the procedure used to establish a binding between an access point and a station, to make the station part of the wireless network managed by the AP. Note that prior to association, a station may be in passive scanning mode, called RF monitor mode herein (see below), but while associated the station is in send-receive mode (see below), called "station" mode in the case of an IEEE 802.11 STA.

Associated station: In an IEEE 802.11 BSS (or ESS) WLAN, communications between stations and other networks is managed by an AP. A station becomes an associated station when it has been successfully accepted by the AP to be part of the wireless network managed by that AP.

Beacon: A periodic 802.11 frame transmitted by an AP that provides information required by stations for establishing and maintaining an association with the AP. The beacon contains the unique identifier called the Service Set Identifier (SSID) for the wireless network of the AP. See also SSID.

BSS: In the IEEE 802.11 standards, a Basic Service Set (BSS) is a single infrastructure wireless network in which all wireless communication occurs via a single access point. See also below under IBSS: an independent BSS.

ESS: An IEEE 802.11 Extended Service Set is a WLAN that includes two or more BSSs, the APs of which may provide service to overlapping physical areas. The APs behave as a single logical router for all nodes in the ESS.

Foreign Agent (FA): A type of Mobility Agent, specifically an IPv4 router on a mobile node's visited network that provides routing services to the mobile node while registered. The foreign agent detunnels and delivers IP packets that were tunneled by the mobile node's home agent to the mobile node. For IP packets sent by a mobile node, the foreign agent may serve as a default router for registered mobile nodes. Foreign agents do not exist in Mobile IPV6. The IP packets themselves include the care-of address and the services provided by a foreign agent in IPv4 is provided by an access router.

Foreign Agent Advertisement: A Mobility Agent advertisement sent by a foreign agent. See Mobility Agent advertisement.

Foreign Network: Any network other than the mobile node's Home Network.

Home Agent (HA): A type of mobility agent, specifically a Mobile IPv4 or Mobile IP version 6 router on a mobile node's home link that maintains current location information for the mobile node in the form of a current care-of address and, while the mobile node is away from home, intercepts packets on the home link destined to the mobile node's home address and tunnels packets for delivery to the mobile node's registered care-of address. A Home Agent is a mobility agent.

Home Address: In Mobile IP, an IP address that is assigned for an extended period of time to a mobile node. It remains unchanged, regardless of where the node is attached to the network.

Home Network: A network, possibly virtual, having a network prefix matching that of a mobile node's home address. Note that standard IP routing mechanisms will deliver IP packets destined to a mobile node's home address to the mobile node's home network.

IBSS: In the IEEE 802.11 standards, an Independent Basic Service Set (IBSS) is a WLAN with two or more wireless nodes that communicate directly without associating with an AP. Also referred to as an ad hoc wireless network in contrast to an infrastructure wireless network.

Infrastructure Network: A wireless network in which all STAs communicate via an AP. See BSS and ESS.

IETF: Internet Engineering Task Force, the standardization body for Internet related technology.

IP: the Internet Protocol, e.g., IP version 4 (IPv4) or IP version 6 (IPv6).

Interface: An interface is used herein in several contexts. In the context of the network layer, e.g., IP including mobile IP, an interface (also an L3 interface) is an L3 node's attachment to a link at L2. In this definition, a node is a device that implements IP, and an L2 link is a communication facility or medium over which nodes can communicate at the link layer (L2), such as a simple or bridged Ethernet. For example, a wireless network device provides a bi-directional interface to a WLAN after a station associates with the AP of the WLAN.

Interface Identifier: A number used to identify a node's interface on a link. In one embodiment, the interface identifier is the set of remaining low-order bits in the node's IP address after the subnet prefix.

Internet Router Discovery Protocol (IRDP): A protocol for routers on a network broadcast their presence to other nodes on the network. A router supporting this protocol periodically broadcasts an Internet Control Message Protocol (ICMP) IP packet containing a "router advertisement." A node on the network may at any time invoke a router advertisement by broadcasting a "router solicitation." Mobile IP defines (RFC 3344) extensions to this protocol that identifies the router advertisement as a "home agent advertisement" and/or a "foreign agent advertisement." See Mobility Agent Advertisement below.

Mobility Agent (MA): In MIPv4, the Mobility Agents are foreign agents that receive data from home agents, and the home agents. In IPv6, the Mobility Agents are access routers and home agents. One aspect of the present invention is the discovery at L2 of mobility agents such as home agents, foreign agents and/or access routers. The term Mobility Agent is used herein as a general term encompassing foreign agents, home agents, and access routers.

Mobility Agent Advertisement: Mobility agent advertisements are transmitted by a mobility agent to advertise its services. Mobile nodes use these advertisements to determine their current point of attachment e.g., to the Internet. A mobility agent advertisement is an Internet Control Message Protocol (ICMP) IP packet that includes a Router Advertisement that has been extended to also carry a mobility agent advertisement Extension. The exact function of the advertisement—home agent, foreign agent, or access router—is identified by a FLAGS field in the extension header.

Mobile IP, IP Mobility: An IETF document (RFC 3344) that describes the infrastructure in which a mobile node may change its attachment point from one network or subnetwork to another without changing its home (IP) address.

Mobile IPv4: Mobile IP for IP version 4. Same as (RFC 3344).

Mobile IPv6: Mobile IP to work with IP version 6. See, for example, David B. Johnson, Charles E. Perkins, and Jari Arkko: "Mobility Support in IPv6" (document title "draft-ietf-mobileip-ipv6-18.txt", available on the Internet at http://www.ietf.org/internet-drafts/draft-ietf-mobileip-ipv6-18.txt. In Mobile IP for IP version 6, the care-of-address is included in the IP packet itself. Therefore, in Mobile IPv6, foreign agents do not exist. The only Mobile IP requirement placed upon the foreign network is to provide an access router capable of routing packets to the Mobile IP node's home address.

Mobile Network: A network that moves together with a Mobile Router. See also Mobile Router.

Mobile Node: In Mobile IP, a node in a network, e.g., a host or router that changes its point of attachment from one network or subnetwork to another. A mobile node may change its location without changing its IP address; it may continue to communicate with other Internet nodes at any location using its (constant) IP address, assuming link-layer connectivity to a point of attachment is available. Mobile nodes may remain at a stationary location or be in motion. For purposes of the present invention, mobile stations and portable stations as defined in IEEE 802.11 can also be mobile nodes if they support Mobile IP.

Mobile Router: A mobile node that is a router. A mobile router provides for the mobility of one or more networks moving together, for example, on an airplane or a ship. The nodes connected to a network served by the Mobile Router may themselves be mobile nodes or routers. Using the present invention, a STA of an infrastructure wireless network that provides routing may be a mobile router.

Mobile Station: In the IEEE 802.11, a type of station that is able to use network communications while in motion. A mobile station is a type of mobile node when Mobile IP enabled. See also portable station.

Portable Station: In the IEEE 802.11 standards, a type of station that may be moved from location to location, but that is only able to use network communications while stationary at a fixed location (i.e., not in motion). A portable station is a type of mobile node when Mobile IP enabled. See also mobile station.

Re-association: In the IEEE 802.11 standards, The process whereby a station associated with an AP transfers association to another—possibly the same—AP. Also commonly referred to as a "hand-off."

RF Monitor Mode: As used herein, a mode for a station during which a wireless network device listens to all MAC frame types (control, management and data) regardless of the AP from where the frames originate or belong to. This means that, if the radio module is in an area covered by more than one AP, it will listen to the traffic broadcast in each AP or wireless network. The purpose of this mode is essentially to enable a wireless station to "scan" for broadcasts from APs, e.g., the broadcast of beacons in the IEEE 802.11 standard, in order to locate an AP with a good enough signal strength with which to associate. It is assumed that one or more of the wireless network device or devices used in embodiments of the invention have an RF monitor mode or equivalent. Note that the process of listening for-beacons is called "passive scanning" in the IEEE 802.11 standard. IEEE 802.11 beacons contain information about the access point, including the service set identifier (SSID) of the WLAN of the AP, supported data rates, and so forth. In a normal IEEE 802.11 scan, the wireless network device provides this information along with the signal strength to compare access points and decide upon which one to associate with. A wireless network device in RF monitor mode can receive from more than one AP, but not transmit information. Other modes include send-receive mode, also called station mode.

Router: A router is a device implementing IP that forwards IP packets not explicitly addressed to itself.

Router Advertisement: An IP packet, in particular an ICMP IP packet periodically broadcasts to all nodes on the network served by a router. In the Mobile IP support provided by IPv4, extensions to the advertisements, referred to as to Agent Advertisements, carry information identifying the router as a foreign agent and/or a home agent.

Send-Receive Mode: In the IEEE 802.11 standard, the communication state wherein a station is able to communicate bidirectionally with its associated AP. Also called station mode. See also RF Monitor mode.

SSID: In the IEEE 802.11 standards, a Service Set Identifier of a wireless local area network. In a simple infrastructure network (BSS), the SSID also identifies the AP. The SSID is sometimes called the wireless network identifier. Many wireless network devices for the IEEE 802.11 standard give a special meaning to a SSID with zero length, called the broadcast SSID. If requested to associate with the broadcast SSID, the station will go to RF monitor mode and scan for all the 802.11 broadcast beacons containing an SSID. In the prior art, the station may then associate with the first AP it finds independent of any L3 information such as whether or not the AP is in communication with a mobility agent.

Station (STA): A node of a wireless network conforming to one of the IEEE 802.11 standards, in particular, a device that contains an IEEE 802.11 conformant medium access control (MAC) and physical layer (PHY) interface to the wireless medium. In the context of the present invention, a station includes a wireless network device that, after associating with an access point of a wireless network, provides a bi-directional interface to that wireless network.

Visited Network: In Mobile IP, a network other than a mobile node's home network, to which the mobile node is currently attached. When attached to a foreign network, the node is said to be "visiting" that network.

Wired Equivalent Privacy (WEP): An 802.11 security protocol for wireless networks. The WEP encryption method is designed to provide security.

Wireless Network device: A device that includes a wireless transceiver, i.e., a wireless receiver and a wireless transmitter, and capable of bi-directional wireless communication. For purposes of the invention, a wireless network device can operate in RF Monitor mode prior to the station containing the wireless network device associating with a wireless network. A wireless network device after associating with an access point of a wireless network, provides a bi-directional interface to that wireless network.

WLAN: Wireless Local Area Network, e.g. a wireless network conforming to one of the IEEE 802.11 standards.

Note that Mobile IP and 802.11 use different terminology and nomenclature for similar network components. For example, Mobile IP refers to a Mobile IP-enabled network node as a "Mobile Node." IEEE 802.11 defines two types of stations: a "mobile" station, able to communicate while in motion, and a "portable" station able to communicate only while at a fixed location. The term Mobile Node when referring to a wireless station means a wireless station that is Mobile IP enabled and that is either an IEEE 802.11 "mobile station" or an IEEE 802.11 "portable station" in the case the station conforms to one of the IEEE 802.11 standards.

SUMMARY OF THE INVENTION

Described herein is a method operating in a wireless station having a wireless network device capable of providing a link-layer interface to a wireless network. The method operates at the link layer (L2) of a multi-layer network protocol and includes, prior to the station being associated with a wireless network via the wireless network device, wirelessly receiving L2 data units transmitted from one or more wireless access point of one or more wireless networks that the station can hear. The method further includes gathering information about the received L2 data units, including L2 information and L3 information. The L3 information gathered at L2 includes whether an AP is sending one or more L3 packets from one or more mobility agents, such that the station may associate with a wireless network that is in communication with a mobility agent. In one embodiment, the method further includes storing information about the wireless networks that the station can hear in a database, including L3 information from the one or more mobility agents. In one embodiment, the one or more wireless networks whose APs transmit L2 data units conform to one of the IEEE 802.11 standards. The information stored about each wireless network includes one or more of an identifier of the wireless network, the L3 information in the L2 data unit received from the AP of the wireless network, a time stamp of when the L2 data unit was received from the AP, and an indication of the signal strength of the L2 data unit from the AP.

One apparatus embodiment described herein is a wireless station that includes having a wireless network device capable of providing a link-layer interface to a wireless network and the implements the method described above in this Summary section.

One carrier medium embodiment described herein is a carrier medium carrying one or more computer readable code segments that when executed on a processor implement the method described above in this Summary section.

DETAILED DESCRIPTION

The present invention provides a mechanism for a station of a wireless network to gather information at L2, prior to associating with an AP, about APs it can "hear," including both L2 information and such L3 information as whether or not an AP is forwarding one or more mobility agent advertisements. This information can be used to emulate, at L2, one or more interfaces to one or more WLANs as if the station was associated to the WLAN, without there necessarily being any association with any WLAN, e.g., prior to associating with any WLAN, where an interface in this context means the STA's attachment at L2 to a WLAN. Such an emulated interface is also called a floating interface herein because there is not necessarily any association yet.

In one aspect of the invention, a floating interface can be presented to L3 in the same manner as an actual interface, so that L3 can perform such functions as mobility agent discovery in the same manner with floating interfaces as with actual interfaces. For example, the gathered information can be provided to the network layer (L3) of the STA. L3 can decide to respond at L3 with another entity that provides mobile IP services. Such a response can then cause the STA to associate with an AP that can communicate with that other entity, for example so that the STA can provide or benefit from mobile IP services. The STA's associating with such an AP converts the emulated interface to an actual interface to a selected WLAN.

In one application, a STA that provides routing can be a mobile router by being associated with an access point that is in communication with one or more foreign agents or MIPv6 access routers. Similarly, a STA can be a foreign agent if it is associated with an access point that is in communication with one or more home agents.

Figure 1:
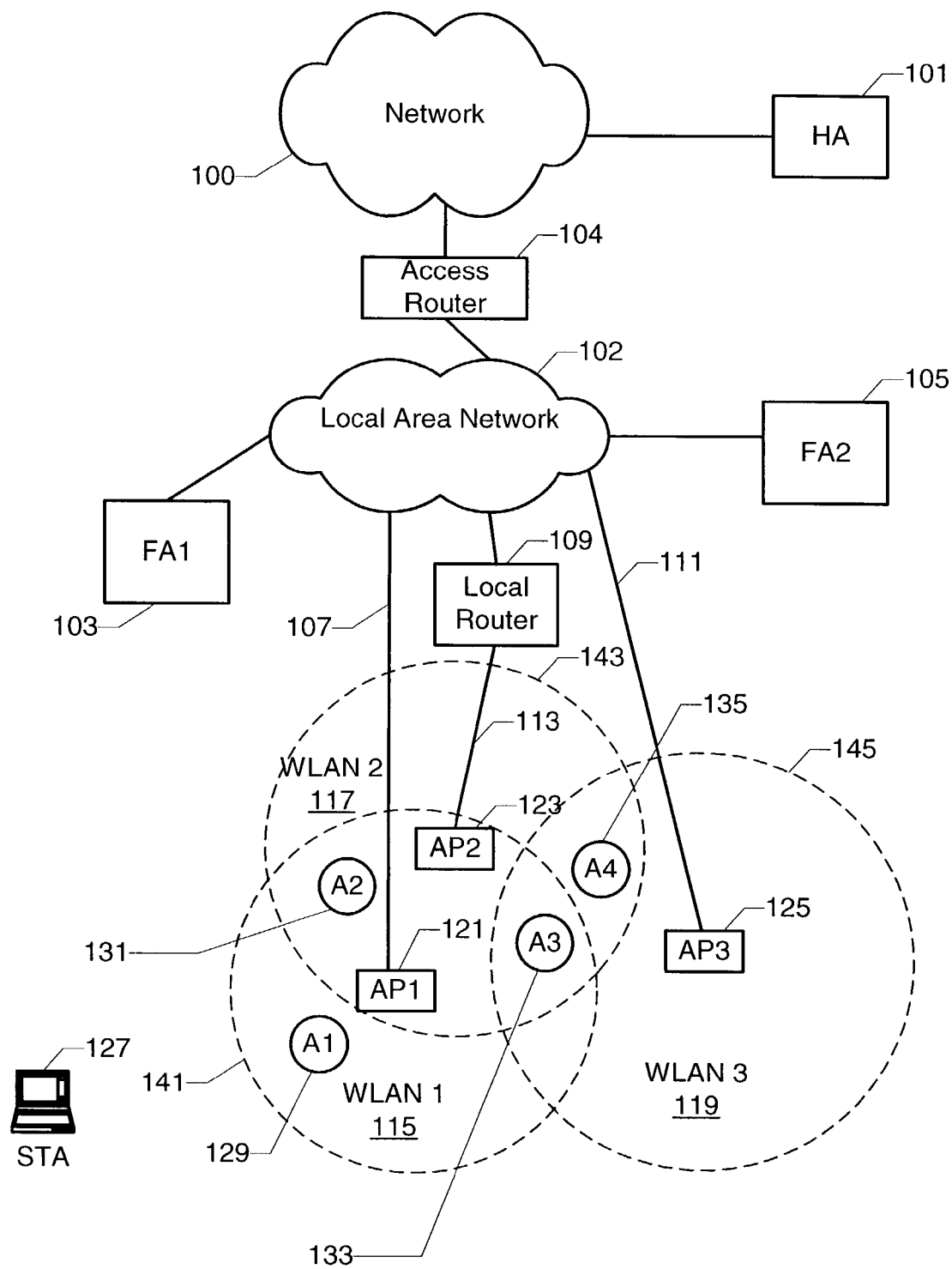
FIG. 1 shows in simplified form one example of a network topology in which the embodiments of the present invention can operate.

FIG. 1 shows in simplified form one example of a network topology in which the embodiments of the present invention can operate. While a topology such as shown in FIG. 1 is prior art, the networks shown in FIG. 1 with any STA practicing any of the method described herein is not prior art. Network 100 is a network that may include one or more other networks. In one embodiment, network 100 is the Internet. Consider a wireless station 127. Suppose STA 127 is Mobile IP-enabled. A mobility agent, home agent 101 (shown as HA 101) for STA 127's home network is coupled to network 100.

Network 102 is a second network, e.g., a LAN, to which are coupled two foreign agents FA1 and FA2, shown as 103 and 105, respectively. Network 102 is coupled to network 100 via an access router 104.

Also connected to network 102 are three wireless LANs, shown as WLAN1 115, WLAN2 117, and WLAN3 119, respectively. In one embodiment, WLAN1 115, WLAN2 117, and WLAN3 119 are each an infrastructure network with an access point AP1 121, AP2 123, and AP3 125, respectively.

Foreign agent traffic to and from FA1 and FA2 to WLAN1 is via the link 107. Foreign agent traffic to and from FA1 and FA2 to WLAN3 is via the link 111. WLAN2 117 is coupled to the LAN 102 via a local router 109 configured to block foreign agent traffic to and from WLAN2. Thus link 113 contains no foreign agent traffic to and from WLAN2.

The dotted lines 141, 143, and 145 represent the limit of acceptable signal coverage for AP1, AP2, and AP3, respectively. Note that the shape of the coverage limit is in practice complex and time varying. The term "acceptable" means that all locations within the coverage area meet the signal quality standards of any station. Location A1 129 represents a location within coverage area 141; location A2 131 represents a location within coverage areas 141 and 143; location A3 133 represents a location within coverage areas 141, 143, and 145; and location L4 135 represents a location within coverage areas 143 and 145.

The following scenarios describe various outcomes of association and re-association for a prior-art system.

Case 1

To illustrate a positive case, assume that a Mobile IP-enabled STA at location A1 seeks to associate with an AP, and is scanning for beacons. In this example, location A1 is within the coverage area of AP1, but outside the coverage areas of AP2 and AP3. Thus, the STA detects the beacon from AP1, and associates with it. Eventually, L3 at the STA detects foreign agent advertisements from either FA1 or FA2 sent via AP1, which triggers the STA's Mobile IP capabilities, enabling it to register with either foreign agent FA1 or FA2. If the STA is a router with Mobile IP capabilities is can then be a wireless mobile router.

Case 2

Assume a Mobile IP-enabled STA at location A2 seeks to associate with an AP, and is scanning for beacons. In this example, the STA is within the coverage area of both AP1 and AP2. Assume that the STA is just as likely to hear the beacon from AP1 as from AP2. If the STA hears the beacon from AP1 first, events proceed as in case #1. However, if the STA hears the beacon from AP2 first, it associates with AP2. Because local router 109 does not route FA advertisements, the STA is unable to establish communication with either FA1 or FA2. Note that in this case, the STA fails to discover an FA half the time. Moreover, if the signal quality from AP2 is higher than that of AP1, the STA may preferentially associate with AP2—despite an acceptable signal from AP1 that is in communication with a FA.

Case 3

Assume a Mobile IP-enabled STA at location A3 seeks to associate with an AP, and is scanning for beacons. In this example, the STA is within the coverage area of AP1, AP2, and AP3. Assume that the STA is just as likely to hear the beacon from any one of the these APs. If the STA hears the beacon from AP1 or AP3 first, because these two APs send FA advertisements from FA1 and/or FA2, events proceed similar to case 1. However, if the STA hears the beacon from AP2 first, it associates with AP2. Because local router 109 does not route FA advertisements, the STA is unable to establish communication with either FA1 or FA2. Note that in this case, the STA fails to discover an FA one third of the time. Moreover, if the signal quality from AP2 is higher than the other two APs, the STA may preferentially associate with AP2—despite an acceptable signal from AP1 and AP3, either of which can communicate with a FA.

Case 4

Assume that a Mobile IP-enabled STA at location A1 has established an association with AP1, and is currently enjoying the benefits of Mobile IP services of FA1 or FA2. Now assume that the STA physically relocates to any of the other indicated positions. Since the STA will re-associate with the first AP whose beacon it receives, it will re-associate with AP2 roughly 40 percent of the time, thus losing its communication with a foreign agent.

The resulting behaviors in cases 2-4 above are clearly undesirable from a usage perspective. Therefore, a need exists to enable a Mobile IP-enabled STA to gather mobile IP information prior to association. In addition, there is a need to enable a STA to preferentially associate with APs that are in communication with Mobile IP mobility agents.

In a prior art system, the criteria by which a station selects an AP for association and re-association occurs entirely at the STA's link layer (L2). There is a need to intercept this process and pass information to the station's L3 so that the station may select an AP for association and re-association based upon network-layer requirements instead of merely link-layer logic.

Providing Floating Interfaces

One embodiment of the invention includes the station, in RF monitor mode, screening all the frames the station can hear, examining the beacons that contain the AP's SSID, extracting from the PHY sublayer the RSSI (Received Signal Strength Indicator), and building a list of the available APs. In one embodiment, this screening is implemented as a module of the protocol stack operating for the wireless network device and in another embodiment by a user-level computer program. The program accesses and configures the protocol stack via a command line interface (CLI). For example, in the case of the STA operating under a networked operating system, such as the Cisco Internetworking Operating System (IOS®) (Cisco Systems, Inc., San Jose, Calif.), IOS provides a command line interface (CLI) for carrying out many network management functions.

The program or module operates at L2. For example, in the case the process forms part of the L2 layer of the stack, the process reads L3 packets in the L2 frames, and can pass the L3 contents of MAC level broadcasts, such as IP IRDP packets used to advertise a foreign agent, to the L3 layer.

Thus, one embodiment of the invention is a method for a station to identify and gather information about the APs that its wireless network device can hear on the WAN prior to association with any AP. In one embodiment, the information is available to any process at the station, e.g., L3 at the station. The information includes IP mobility information, e.g., whether the AP is sending mobility agent advertisement. In one embodiment, the information is used to build a set of one or more floating interfaces to available WLANs, in the form of APs for association. An L3 process can then select from among the available APs using one or more criteria. For example, the L3 process can then select an AP that is in communication with one or more Mobility Agents or an AP that meets some signal strength criterion or a combination of criteria.

An illustrative example of a network topology in which the invention can operate is shown in FIG. 1, although the invention can operate in any network where there exist one or more APs. Some of the APs may be sending advertisements from one or more mobility agents while other APs may not be in communication with any mobility agent.

Figure 4A:
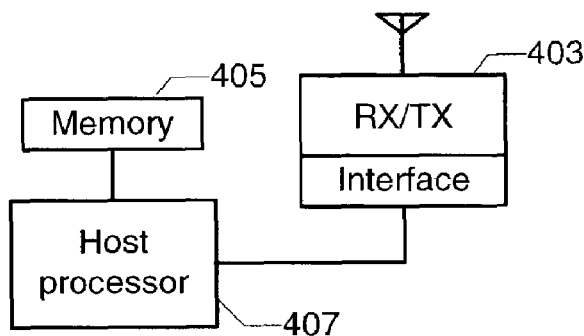
FIG. 4A shows a simplified block diagram of one wireless station embodiment.

FIG. 4A shows a simplified block diagram of one wireless station embodiment that includes a wireless network device 403 that includes a wireless transceiver and that provides and accepts MAC frames to/from a protocol stack in a host processor 407. When the STA is associated with an AP of a WLAN, the wireless network device 403 provides an (actual) bi-directional interface to the WLAN, i.e., connection point to the AP at the STA. The processor 407 of the wireless includes a memory 405 that may include volatile and non-volatile memory. The embodiments of the processes described herein operate on the processor and use the memory.

Figure 2A:
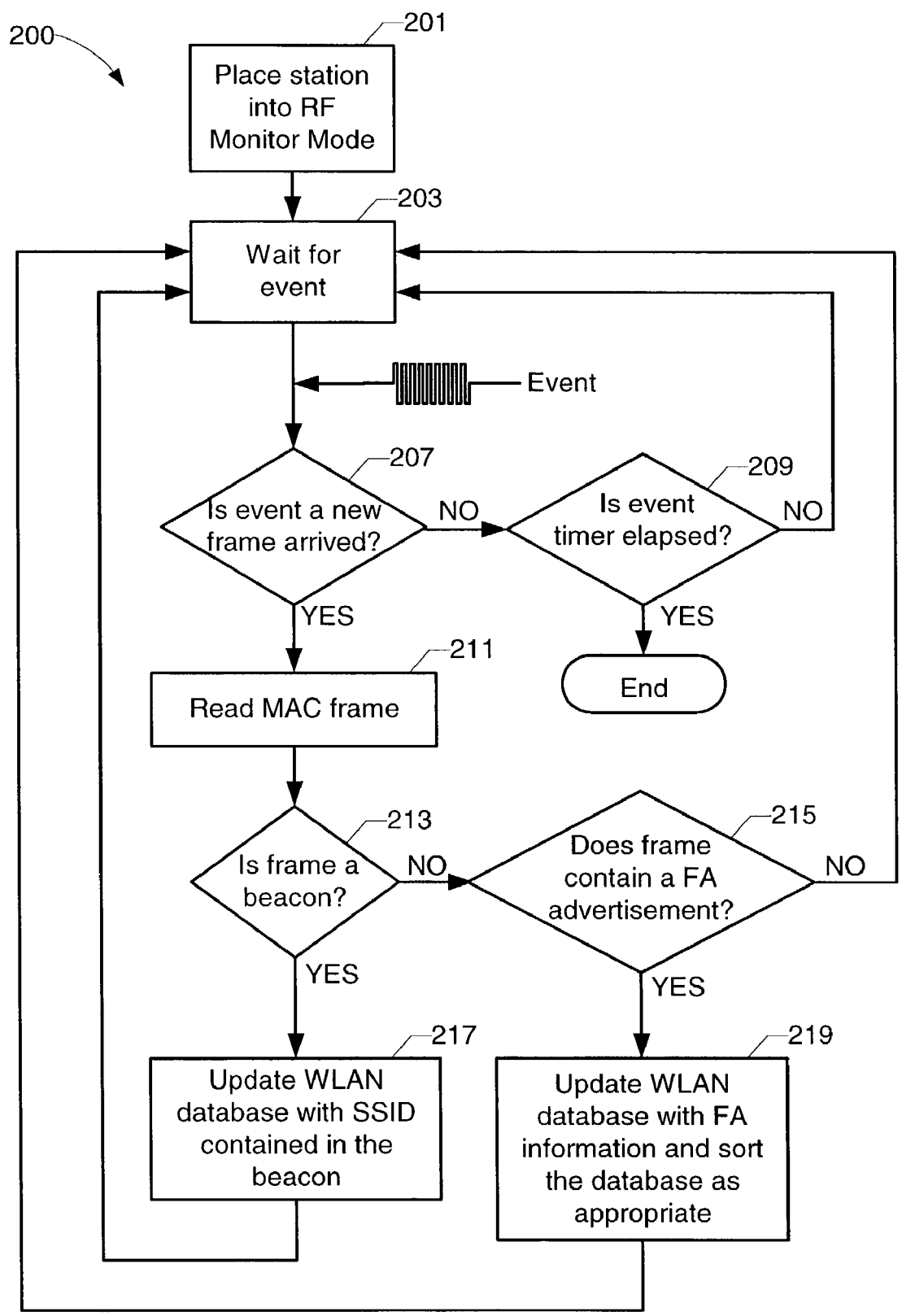
FIG. 2A shows a simplified flow chart of one aspect of the invention, according to which a station in monitor mode listens at L2 to all the L2 network traffic from all the APs in its radio range to ascertain whether there are APs in communcation with any mobility agents.

FIG. 2A shows a simplified flow chart of an L2 process 200 that in one embodiment operates on the processor 407. According to one aspect of the invention, process 200 includes the station listening in RF monitor mode to all the network traffic from all the APs in its radio range in order to gather AP information, including mobility agent information. The station is assumed not to be associated with an AP. In a step 201, if the station is not in monitor mode, a device-specific command from the program or module causes the station to place the wireless network device 403 into RF monitor mode. State 203 is a wait state waiting for an event such as a new link-layer PDUs (MAC frames) arriving at the wireless network device 403. In a step 207, it is ascertained if indeed the event is a MAC frame arriving. If not, and, in one embodiment, if an event timer has not expired (209), the process continues at the wait state 203 for an event to occur.

If the event is a new frame arriving, the new MAC frame arriving is read at L2 in a step 211.

Included in each MAC frame is additional information, for example the SSID of the WLAN, i.e., the identifier of the AP that originated the packet. Also provided, for example by the wireless network device as ancillary information, is an indication of the quality of the wireless signal at the time the MAC frame was received. The L2 frames may have L3 information encapsulated, e.g., in the form of IP packets. For example, the IP packet may include a mobility agent advertisement such as a foreign agent advertisement or a home agent advertisement.

Without benefit of the present invention, the link layer prior to association of the STA, e.g., while in RF monitor mode would not concern itself with any encapsulated L3 information such as mobile IP information. In one aspect of the present invention, an L2-level process "peeks" inside the payload portion of each just-received L2-frame in order to collect L3 information such as Mobile IP information. In one embodiment, the collecting of L3 information includes ascertaining whether the frame encapsulates information from a mobility agent, and, if so, whether that information contains a mobile agent advertisement.

In one embodiment of the invention, information about the AP that transmitted the received L2 packet is stored as a record in a data structure stored in the memory 405 of the STA and called the "WLAN database" herein. The WLAN database 409 thus includes information on the APs that the STA hears in RF monitor mode. A STA hearing an AP means that the signal at the STA received from the AP is of a sufficient strength for the AP and STA to wirelessly communicate.

Each record in the WLAN database includes a set of fields on information about an AP from which an L2 packet was received. In one embodiment, the information in the record includes L2 information and also L3 information that would not normally be available until after the station was associated with the AP. Each record in the WLAN database thus provides a floating interface to the WLAN via one of the APs that the station can hear. Associated with each floating interface is the WLAN and the station's wireless network device that the interface can use to establish an actual interface to the WLAN. The floating interface can be provided to the network layer (L3) at the station as if it was an actual interface to a WLAN even though there may not be association to that WLAN.

In one embodiment, each record includes an indication of the state of the floating interface from the states shown in Table 1 below.

TABLE 1

| State | Description of State |
|---|---|
| Interface down | The AP of the WLAN is not found in the wireless medium |
| Interface up, protocol down | The AP of the WLAN is found but cannot be associated with. |
| Protocol up (mimicked) | The AP of the WLAN is found and is available for association. |
| Protocol up (real) | The WLAN is currently associated with the station. |

One embodiment includes the following fields in each record of the WLAN database: an identifier of the WLAN in the form of the SSID of the WLAN of the AP the frame was received from, the IP packet from the received L2 frame, a time stamp of when the frame was received, an indication of the signal strength of the frame from the AP, the state of the floating interface to the WLAN. In one embodiment, each record also includes an indication of any mobility information contained in any IP packet in the received L2 frame, e.g., of any mobility advertisement from a mobility agent.

In one embodiment, each record in the WLAN database includes a flag field that when set indicates that the record is the Most-Recently-Used-Association (MRUA) record. The MRUA always holds the record for the AP that was used for the most recent association or re-association. The MRUA record is never evicted from the WLAN database, for example to create space for more records.

In an alternate embodiment, the WLAN database includes a field that indicates the N-last associations with APs that wirelessly transmitted mobility information from different mobility agents.

The WLAN database is searchable and orderable by one or more fields, including the time stamp and one or more of the headers in the stored L2 frame.

Figure 4B:
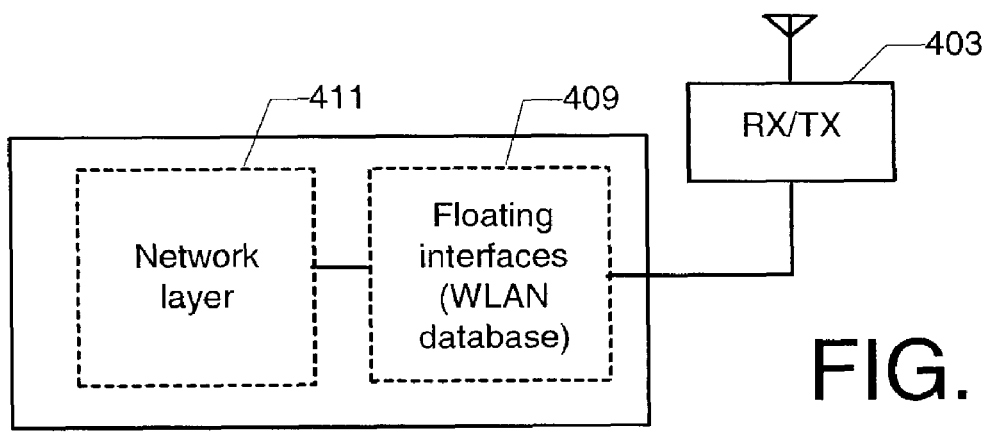
FIG. 4B shows the STA of FIG. 4A in more detail. In addition to a conventional protocol stack 411, STA includes in its memory an access point database called the "WLAN database." An aspect of the invention provides a set of floating interfaces between the protocol stack that sends to and receives IP packets and one or more wireless networks even though there may not be an association yet with the wireless networks.

FIG. 4B shows a STA that includes, in addition to a conventional protocol stack, a WLAN database that provides a set of floating interfaces 409 of the WLANs that a wireless network device 403 can hear. The floating interfaces are provided to the network layer 411 of the protocol stack.

In one embodiment, the STA's memory 405 includes volatile memory and the WLAN database is located in the volatile memory, e.g., DRAM. In another embodiment, the STA's memory 405 includes non-volatile memory, e.g. SRAM, and the WLAN database is located in the non-volatile memory. In one embodiment, the WLAN database is accessible to other processes operating on the STA, or to other processes on other processors on the network.

One station embodiment includes more than one wireless device (or a device with several channels that can simultaneously provide interfaces to different WLANs) each capable of association with a WLAN, so each capable of providing an interface to a WLAN. In such an embodiment, each record in the WLAN database further includes an identifier of the wireless device that would provide the actual interface after association with the WLAN of the floating interface, and information on one or more capabilities of the actual interface to the WLAN, such as speed, latency, and so forth.

In the embodiment corresponding to the flow chart of FIG. 2A, the WLAN database includes records, i.e., provides floating interfaces for the APs that the STA can hear whether or not the AP sends one or more L2 frames that include mobility agent information. In an alternate embodiment (not shown in FIG. 2A), the WLAN database includes records only for APs that the STA can hear and that have transmitted mobility agent information. In such an alternate embodiment, if it is ascertained in the peeking that the L2 frame does not contain an IP packet from a mobility agent, flow returns to 203 to accept another L2 frame.

Returning to FIG. 2A, in a step 213, it is ascertained whether the MAC frame is a beacon. If yes, the WLAN database is updated with the SSID contained in the beacon. If the frame is not a beacon, is is ascertained in a step 215 whether the frame encapsulates information from a mobility agent, and, if so, whether that information contains a mobility agent advertisement.

If it is ascertained that the MAC frame is not a beacon and does not include a mobility agent advertisement, the process returns to wait state 203 to wait for another event such as a new MAC frame arriving at the station.

Once it is ascertained that a received MAC frame contains mobility agent information, the WLAN database is updated with this information (step 219). In one embodiment, the insertion of the new L3 information includes ordering—e.g., sorting—the records according to one or more ordering criteria. In one embodiment, the purpose of ordering is to present the information to L3 in a desired order so that L3 automatically selects a floating interface for association according to one or more selection criteria. In such a case, the ordering criteria map to the selection criteria. In one embodiment, the ordering criteria (and/or interface selection criteria) include ordering (and/or selecting) according to one or more application-related requirements. For example, an application may have a set of SSIDs that it prefers for one or more reasons such as: security characteristics of the WLANs, quality of service each WLAN provides, cost of access, and so forth.

In one embodiment, the ordering criteria (and/or interface selection criteria) include ordering (and/or selecting) according to one or more quality of service parameters, such as required quality of service. One aspect of the invention is that the ordering criteria (and/or interface selection criteria) include L3 information such as what mobility agent information is included. In an embodiment that further includes more than one wireless device, the ordering criteria (and/or interface selection criteria) include the capabilities of the physical interface to the WLAN, such as speed, latency, and so forth).

Thus, in one embodiment, records that include a mobility agent advertisement are given priority. In one embodiment, the ordering criteria include ordering according to received signal quality. One embodiment orders according to a combination of more than one ordering criteria, such as giving priority to those records that include mobility agent information, and further ordering such prioritized, i.e., mobility-agent-related records according to signal strength.

One embodiment of step 219 of updating the WLAN database includes discarding those records not meeting one or more acceptance criteria. In one embodiment, the acceptance criteria include the received signal quality meeting or exceeding a pre-defined level of quality. In another embodiment, in which the mobility agent is a foreign agent, the acceptance criteria include only accepting IP packets that are of foreign agent advertisements that indicate that the foreign agent is not "busy", i.e., that the foreign agent is accepting registrations.

The process of FIG. 2A thus provides a WLAN database of available WLANs that includes L2 and L3 information. This information is available at any time to another process, e.g., L3.

In one embodiment, the process of FIG. 2A occurs from time to time so that the information in the WLAN database is up-to-date. In one embodiment, the process is repeated periodically. That is, the WLAN database is updated from time to time by placing the station into RF monitor mode and updating the information in the WLAN database with new MAC frames. The process of FIG. 2A thus provides a WLAN database of available WLANs that includes L2 and L3 information. Any process (e.g. L3) at the station can obtain information from the WLAN database at any time.

Interface Selection

The floating interfaces in one embodiment behave as real interfaces. This includes the interfaces being included in one or more routing tables. In general, an interface (floating or not) appears in a routing table at the station when it is in state "up." In one aspect of the invention, this includes floating interfaces that are in the "protocol up (mimicked)" state. Thus, in one embodiment, the L2 module or process that, for any reason, puts the interface in state "up," also adds the interface to the routing table associated with the L2 link the interface is attached to.

Another aspect of this invention is selecting an interface from the set of floating interfaces in the WLAN database. One embodiment includes a method of selecting an interface based on one or more selection criteria.

In one embodiment, the interface selection criteria include selecting according to one or more application-related requirements. In one embodiment, the interface selection criteria include selecting according to one or more quality of service parameters, such as required quality of service. In one embodiment, the interface selection criteria include L3 information such as what mobility agent information is included. When the station is capable of having more than one physical interface to more than one WLAN, the selection criteria include the capabilities of the physical interface to the WLAN, such as speed, latency, and so forth. In one embodiment, the interface selection criteria include L2 information such as the signal strength of frames from the AP of the WLAN. The selection is preferably made according to a combination of criteria.

To actually select an interface from the set of floating interfaces, an L3 process sends IP data to the selected floating interface. In one embodiment, the process is the L3 of the protocol stack. The selected floating interface is assumed to be in "protocol up (mimicked)" state. Sending data to such a protocol causes the wireless device to go from RF monitor (scan) mode into station mode and associate with the corresponding SSID of the selected floating interface.

If there are no free physical wireless devices available that can hear the AP of the selected SSID WLAN, one embodiment includes dropping an existing association. The process then modifies the record of the AP database by changing the interface state to "protocol up (real)" and further changed updates the MRUA flags.

The associating in one embodiment occurs immediately, or in another embodiment, only when there are packets to send on that interface.

Automatic Selection

In one embodiment, selected IP packets, e.g., those containing a router advertisement message of type foreign agent in the record of the WLAN database are made available from L2 to L3 according to an order. This mimics an L2/L3 interface providing the network layer with IP packets, even though there is no communication from the network level of another entity. In such an embodiment, the records are first ordered in step 219 according to one or more ordering criteria (see above). The L3 packets are presented to L3 in the order so that L3 automatically selects a floating interface for association according to one or more selection criteria. That is, in the embodiment that preferentially provides IP packets with mobility agent advertisements, the network layer receives the IP packets with the mobility agent advertisements even though the STA is not yet part of a WLAN, i.e., associated, and not yet in bi-directional communication with the mobility agent.

One application of such automatic selection is operating the station as a wireless mobile router. The station is also a router configured to provide mobile router services and includes a wireless device to provide a physical interface to a WLAN, and dedicated to connect to mobility agents that are foreign agents or access routers that transmit mobility advertisements. The process described above provides a WLAN database of floating interfaces. In the case of implementing a mobile router, WLAN database records are each floating interfaces to WLANs that receive mobility information from foreign agents or IPv6 access routers. The wireless network device 403 stays in RF monitor mode until the mobile IP opens a floating interface by sending an IP packet to a mobility agent such as a foreign agent in order to register to the mobility agent.

In one embodiment, the station may "lock" an association in a floating interface that is in the protocol up (real) state so that L2 may not de-associate the floating interface as might occur when there is a request to associate with a different WLAN. The locking of floating interfaces is used, for example, when implementing a mobile router. Once a mobile router completes registration with a foreign agent or access router, it can lock the floating interface.

The network layer accepts the IP packets from L2 as if in normal communication. Assume that the first few IP packets include mobility agent advertisements, e.g., from a foreign agent or a home agent. The network layer selects a mobility agent and typically responds by sending an IP packet to the selected mobility agent by passing the mobility agent-bound IP packet to L2 at the STA via a selected interface.

Figure 2B:
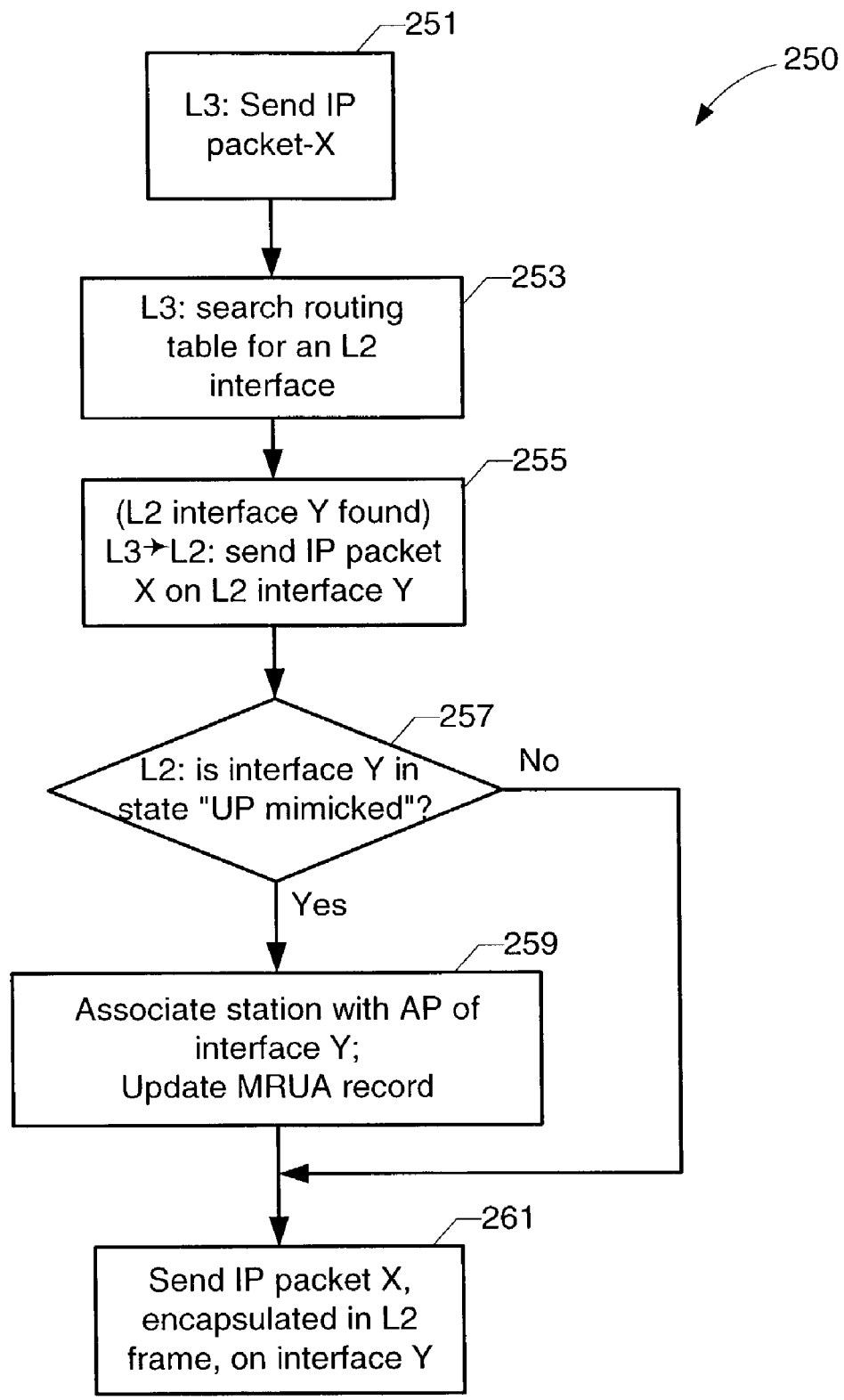
FIG. 2B shows one embodiment of a process of sending any IP packet, optionally going through association with an AP if the interface selected is a floating interface in an up (mimicked) up state.

FIG. 2B is a flow chart of one embodiment of a process 250 of sending an IP packet, optionally going through association with an AP if the interface selected in the process is a floating interface in the "protocol up (mimicked)" state. Thus, process 250 includes for example associating with one of the APs in the WLAN database as a result of the network layer of the STA sending an IP packet to one of the mobility agents connected to the APs of the WLAN records in the WLAN database.

In a step 251, L3 selects to send an IP packet ("Packet X"). In a step 253, L3 searches the station's routing table for a suitable L2 interface on which to send the IP packet. According to one aspect of the invention, the routing table includes information about the floating interfaces from the WLAN database. Step 255 assumes that a suitable L2 interface ("Interface Y") is found. In a step 255, the IP packet X is sent from L3 to L2 on the L2 interface Y.

Upon receipt of an IP packet X from the network layer, in a step 257, the link layer examines the state of the selected Interface Y to ascertain whether or not it is in the state "protocol up (mimicked)." If yes, at a step 259, the STA associates with the AP identified by the SSID of its WLAN of interface Y. Step 259 further includes updating the WLAN database to mark the record of interface Y as the MRUA record. The associating of the STA takes the STA from RF monitor mode to STA mode. Once associated, the link layer passes (step 261) the just-received IP packet X, encapsulated in an L2 frame, on interface Y so that it can be communicated via the just associated AP to the foreign agent. This, for example, may be to register with the mobility agent.

At this point, the station is associated with an AP that is in communication with one or more mobility agents. If IPv4 is in use, the mobility agent is a foreign agent or a home agent. If IPv6 is in use, the mobility agent is an access router or a home agent.

If in step 257 it is ascertained that the interface Y is not in "protocol up (mimicked)" state, it is assumed to be in "protocol up (real)" and the process continues with step 261 of sending the IP packet X, encapsulated in an L2 frame, on interface Y.

In one embodiment, the station may "lock" an association in a floating interface that is in the protocol up (real) state so that L2 may not de-associate the floating interface as might occur when there is a request to associate with a different WLAN. The locking of floating interfaces is used, for example, when implementing a mobile router. Once a mobile router completes registration with a foreign agent or access router, it can lock the floating interface.

Qualification of L2 Frames

Steps 213 and 215 of FIG. 2A include parsing an L2 frame, ascertaining whether the frame is a beacon, ascertaining whether any given frame includes an IP packet, and ascertaining whether the IP packet contains a mobility agent advertisement. In one embodiment, the advertisement is further qualified as a foreign agent advertisement (in the IPv4 case), as an access router advertisement (in the IPv6 case), or as a home agent.

How to so parse a frame would be known to those in the art, and software and hardware to so parse frames is readily available. Modifying such code to be part of any embodiment described herein would be straightforward to those in the art. Briefly, as an example, one embodiment of step 215 includes, in the case that the frame is not a beacon, identifying the payload portion of the MAC frame and determining whether this particular packet is an IP packet, for example by examining the contents of the payload at the offset where the IP version number is stored. If a valid IP version, e.g., a 4 or a 6, is found at this location, the parsing process may branch differently depending on the IP version number. For version 4, a IPv4 mobility agent advertisement is searched for, while for version 6, a mobility agent or a router advertisement IP packet is searched for. In both cases, the IP packet searched for is of the type ICMP.

Re-Association

One embodiment of the present invention is a method for a station that is associated with a first WLAN to be re-associated with a second (possibly the same) WLAN. In the case that the AP of the first WLAN is in communication with a first mobility agent, the re-association is such that the station preferably retains communication with the first mobility agent.

Re-association is triggered by a variety of events. These events include, but are not limited to the wireless signal quality becomes unacceptable, physical impairment of the wireless signal, and failure of the AP with which the station is associated. The signal quality may degrade because the station physically moves to another location or because of some other degradation in the air interface. The physical impairment of the wireless signal may be by a person or object.

The re-association process described herein also occurs when, in the case that the station includes more than one wireless network device, connection to the WLAN is swapped automatically from the present wireless network device to another one of the wireless network devices. This might happen, for example, when there is a need for the station to associate with a particular WLAN that only the present wireless network device can hear.

When re-association is triggered, the floating interface to that associated WLAN changes state from "protocol up (real)" to "protocol down."

Figure 3:
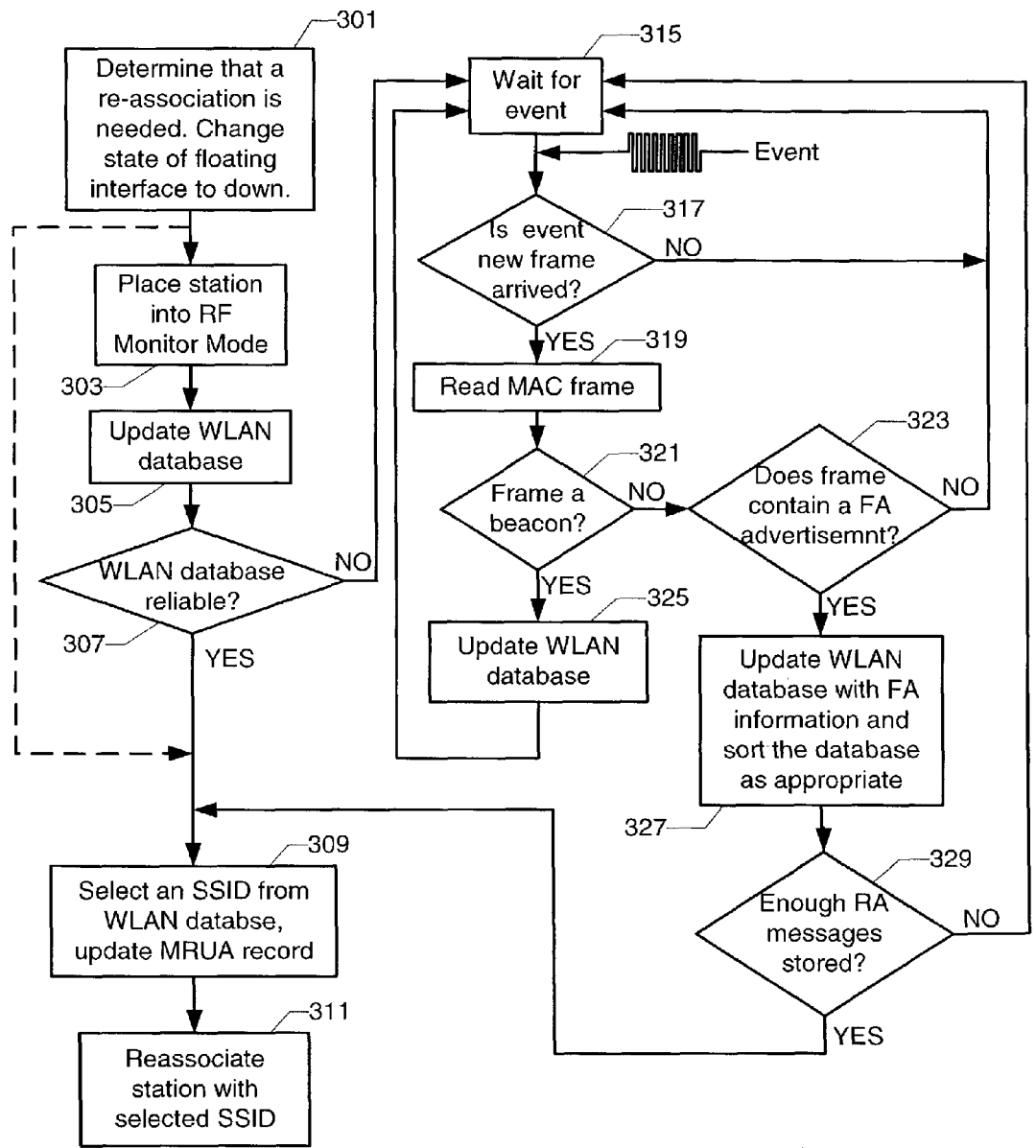
FIG. 3 shows a simplified flow chart of one embodiment of a re-association process.

FIG. 3 shows a flow chart of one embodiment of a re-association process 300.

Simple Re-Association and Re-Association with WLAN Database Upgrade

For any of the above reasons e.g., loss of AP signal or unacceptable signal quality degradation, in a step 301, the station's link layer may determine that a re-association is required. In such a case, the state of the floating interface is modified to down. As explained earlier, without benefit of the present invention, the station may re-associate with the first available AP with suitable signal quality. In the following, it is assumed that the AP of the associated WLAN is able to communicate with one or more mobility agents as determined, for example, by the AP periodically sending a mobility agent advertisement from a mobility agent.

In one embodiment of the invention, once the state of the floating interface is changed to down, the process continues in step 309 (see below) where a WLAN, i.e., an SSID, is selected for re-association.

In another embodiment, prior to the attempt at re-association, the WLAN database is first updated. In some embodiment, this also even when there is no signal degradation or other reason for re-associating, but rather in order to ensure that the information in the WLAN database on the floating interfaces is up-to-date.

To update the WLAN database, in a step 303 the L2 process 300 places the station's wireless transceiver into RF monitor mode. In RF monitor mode, the station listens to all wireless traffic from all APs it can hear. As noted earlier, such monitoring is not possible when the station is associated with an actual AP.

In a step 305, the WLAN database is updated to ensure that each record is reliable according to one or more reliability criteria. Step 305 includes updating the state of each record, i.e., each floating interface in the WLAN database. In one embodiment, one criterion for a record in the WLAN database to be reliable is that the record's AP can still be reliably communicated with on the wireless medium. One embodiment of step 305 includes the station monitoring AP beacon signals from the APs in the WLAN database, making certain that every AP in the WLAN database still exists. Records other than the MRUA are purged in step 305 if no beacon signal of a sufficiently high signal quality is detected for that record's SSID. The MRUA record is kept because it contains information about the first mobility agent, i.e., an agent the AP was able to communicate with. As APs typically transmit a beacon relatively frequently, the time required to purge one or more records from the WLAN database is small compared to the time that would be required to rebuild the WLAN database.

In one embodiment, step 305 further includes checking the timestamp of each WLAN database record and discarding records of more than a pre-defined age, other than the MRUA record.

In a step 307, the overall reliability of the database is checked. In one embodiment, the reliability is a function of the number of records that still contain reliable information and that include the mobility agent information. In another embodiment, the database is judged reliable if it still contains a reliable MRUA record.

If the WLAN database is judged reliable, the process 300 continues in a step 309 (see below). If on the other hand, the WLAN database is judged unreliable, the database is built up by adding reliable records starting a wait state 315 wherein the station waits, in RF monitor mode, for an event. The process of building up the database is essentially the same as illustrated in the flowchart of FIG. 2A. In one embodiment, an extra check is made to ensure that there are enough records in the WLAN database that include mobility information, e.g., router advertisement messages. Thus, starting from the wait state 315, when an event occurs, a step 317 ascertains that the event is a new MAC frame arriving. If not, the process returns to the wait state. In one embodiment (not shown in FIG. 3), a timer is also checked to ensure it has not elapsed. When a new MAC frame arrives, it is read in a step 319. The frame is checked to ascertain if it a beacon, and if yes, the WLAN database is updated with information such as the signal quality, and the process returns to the wait state 315. If the MAC frame is not a beacon, a step 323 parses the frame and ascertains whether it contains mobility information, e.g., a foreign agent advertisement. If not the process returns to the wait state 315.

If the frame is ascertained to contain mobility information, the WLAN database is updated with the information, e.g., the foreign agent information. In one embodiment, the database updating step of process 327 further includes ordering the records according to one or more ordering criteria. This step is similar to the ordering described above described above. In one embodiment, the ordering criteria include ordering according to what mobility agent information is included.

In one embodiment, a check is made in a step 329 to ascertain whether or not there are enough appropriate messages stored in the WLAN database. In one embodiment of the invention, the number required for sufficiency is variable, derived dynamically on history. In another, the number required for sufficiency is based upon a prior knowledge of the number of mobility agents on the network. In another embodiment of the invention, a sufficient number is one record that includes an L2 frame encapsulating L3 mobility information. In yet another embodiment the number is greater than one. If it is ascertained that an insufficient amount of mobility agent information is included in the WLAN database, the process continues with the wait state 315 of waiting for another L2 frame.

Once it is ascertained that the WLAN database is reliable, or once the database has been sufficiently rebuilt, it contains at least the MRUA record.

In step 309, a WLAN, i.e., an SSID is selected for re-association according to one or more re-association criteria. Recall that the MRUA record contains information about the association that existed before it was determined that re-association was needed. In one embodiment, the re-association criteria include that the selected wireless network, i.e., selected SSID, is in communication with the foreign agent that sent the router advertisement message contained in the router advertisement message portion of the MRUA record. In one embodiment, step 309 includes searching the (non-MRUA) records of the WLAN database for one or more records whose foreign agent IP addresses matches the address of the mobility agent contained in the IP packet portion of the MRUA record. In one embodiment, the re-association criteria further include the received wireless signal quality. Thus, if more than one match is found, the SSID with the highest received wireless signal quality is selected for re-association.

If no matching IP addresses are found in step 309 other than the MRUA record itself, in one embodiment, step 309 includes searching the WLAN database for alternative mobility agents of the same kind, e.g., another foreign agent or another home agent. If records for more than one alternative mobility agent are found, step 309 includes selecting the mobility agent with the highest wireless signal quality. In one embodiment, if no re-association is possible, the process returns to RF monitor mode (step 303) again.

In a step 311, the STA re-associates with the selected AP. This step includes updating the MRUA record as required and updating the interface state field from protocol up (mimicked) to protocol up (real).

Thus, at completion, the station is re-associated with a WLAN whose AP is in communication with the mobility agent from the most recent association. If no such AP exists, the station is re-associated with an AP in communication with a different, but suitable mobility agent.

In one embodiment, e.g., when the station is a mobile router, the re-association process signals to the L3 processes in the station that a re-association has occurred. If L3 at the mobile router is registered with a foreign agent or access router via the WLAN of the floating interface that has re-associated, an L3 process in the station polls the foreign agent or access router in order to assert its registration station. In one embodiment, the station attempts at L3 to register with the foreign agent or access router. Once registration is successful or re-asserted, the mobile router causes the association with the WLAN to be locked on the wireless network device.

In one embodiment, if a WLAN, i.e., the AP of the WAN that is present in the air can no more be associated with, due to locked floating interfaces, the process providing the floating interfaces sets the matching floating interface to "protocol down." Once an interface is freed up that allows the association to that SSID (even if swapping is required), it is set back to "protocol up (mimicked)."

Alternate Embodiments with N-MRUA Entries in the WLAN Database.

In an alternate embodiment, the WLAN database includes a field that indicates the N-last associations with APs that wirelessly transmitted mobility information from N different mobility agents. The processes described above of building the WLAN databases and of re-associating the STA with an AP are modified. For example, the re-association process 300 can by modified to re-associate with a maximum number of the last N associations. One embodiment includes placing a time limit once a sufficient number of candidates for association is found. In one embodiment, N=4 and the sufficient number is 1 if the STA is not itself a mobility agent, and one of each kind in the case that the STA was both acting as a mobility agent and also itself a mobile node.

Stations having Multiple Wireless Network Devices

Some station embodiments include more than one wireless network device. Each wireless network device can only associate with one WLAN at a given point in time. In one such embodiment, each wireless network device can go into its own RF monitor mode. Thus, the flow chart of FIGS. 2A and 3 includes each device monitoring for beacons it can hear. This is used, for example, if it is possible albeit unlikely that two wireless devices can hear non-identical sets of APs. Note that by multiple wireless devices is meant that the stations can have multiple interfaces to WLANs active at the same time. It may be that one physical device provides the plurality of interfaces, and the term multiple wireless network devices includes the case of the station having one such multiple-interface device.

Expedited Re-Association Using Two Wireless Devices

In a station with a single wireless network device, the time to locate mobility agents is unpredictable, and depends upon configuration of the routers that act as mobility agents. Therefore, the time between mobility agent advertisements can be relatively long. This is especially true on high traffic networks, where broadcast and multicast traffic may be restricted, e.g., by network administrators. Moreover, in critical applications where re-association needs to happen rapidly, such as on a mobile network where the access router is itself a wireless station, slow re-association results in loss of connectivity to every node on the network. It is therefore desirable to have a relatively fast re-association process.

In the above described association (see FIGS. 2A and 2B) and re-association embodiments (see FIG. 3), the speed of association or re-association may be dominated by the time spent in RF monitor mode collecting mobility agent IP packets.

In another embodiment of the invention, the STA includes a second wireless network device dedicated to listening to APs in RF monitor mode. The listening includes collecting mobility agent information such as advertisements to build up the WLAN database. The WLAN database is shared. In one embodiment, the second wireless network device is used for a floating interface because its mode does not change to station mode and it never associates with a WLAN.

Figure 5:
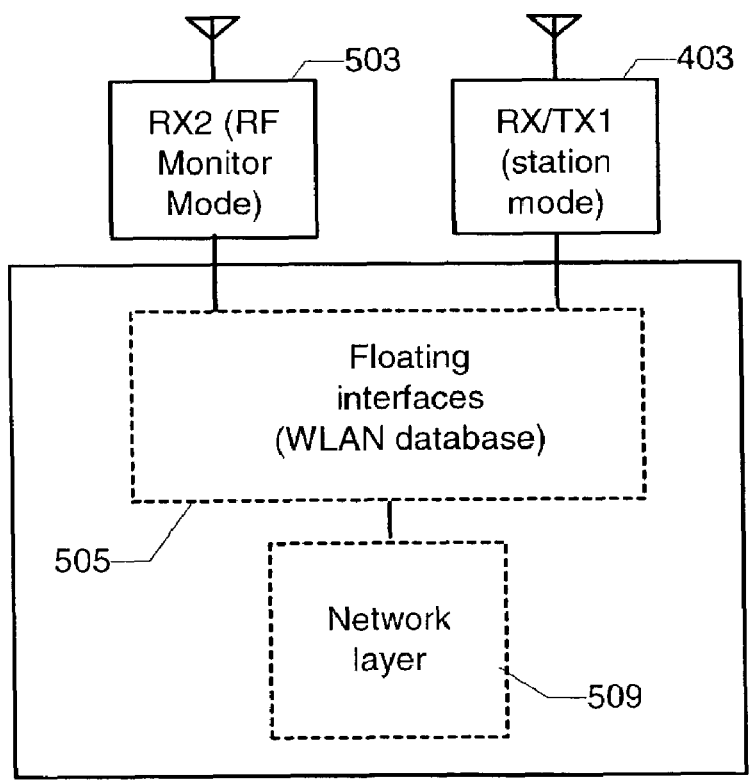
FIG. 5 shows a STA that includes a first wireless network device and a wireless network device in RF monitor mode such that the STA can re-associate relatively quickly according to one aspect of the invention.

FIG. 5 shows one such alternate station embodiment. The STA includes a first wireless network device 403 providing WLAN services and a second wireless network device 503. In one embodiment, the second wireless network device does not include a transmitter, i.e., is a receive-only device, while in another embodiment, the second wireless network device uses the receiver portion of an included transceiver.

Once an initial association of the STA with an AP has occurred, the first wireless network device 403 provides an actual interface to the WLAN of the AP, while the second wireless network device 503 monitors network traffic in RF monitor mode. The two wireless network devices are coupled to the network layer 511 of a protocol stack included in the STA via a set of floating interfaces 505 that use a WLAN database stored in memory. The monitoring of the AP traffic by the second wireless network device 503 adds information to the WLAN database 509, including adding mobility agent information, as described above. The initial association includes sending an IP packet to the network layer via the floating interfaces 505 so that the network layer can preferentially "respond" to a mobility agent, even when there is no actual communication yet between the STA and the mobility agent. The response is intercepted by a selected floating interface in protocol up (mimicked) state, causing the STA to associate—using the first wireless network device 403—with the AP from which the mobility agent information was transmitted. After that, communication may proceed via the first wireless network device 403. The second wireless network device continues monitoring in RF monitor mode and updating the WLAN database. When re-association becomes necessary, the set of floating interfaces provide the WLAN database record for the AP that is the best candidate for re-association.

Thus, referring to FIG. 2A, in one embodiment for the STA that has two wireless network devices, the process 200 of initial building of the WLAN database may use data received at the first or the second wireless network device. Step 201 is not necessary when the second wireless network device is always in RF monitor mode. At step 203, the process accepts a MAC frame from the second wireless network device.

Referring to FIG. 2B, in one embodiment for the STA that has two wireless devices one of which is in RF monitor mode, the process 250 of associating associates the STA with the selected WLAN (i.e., an AP) in step 259 using the first wireless network device. Step 261 passes the IP packet to the MAC layer also using the first wireless network device.

Figure 6:
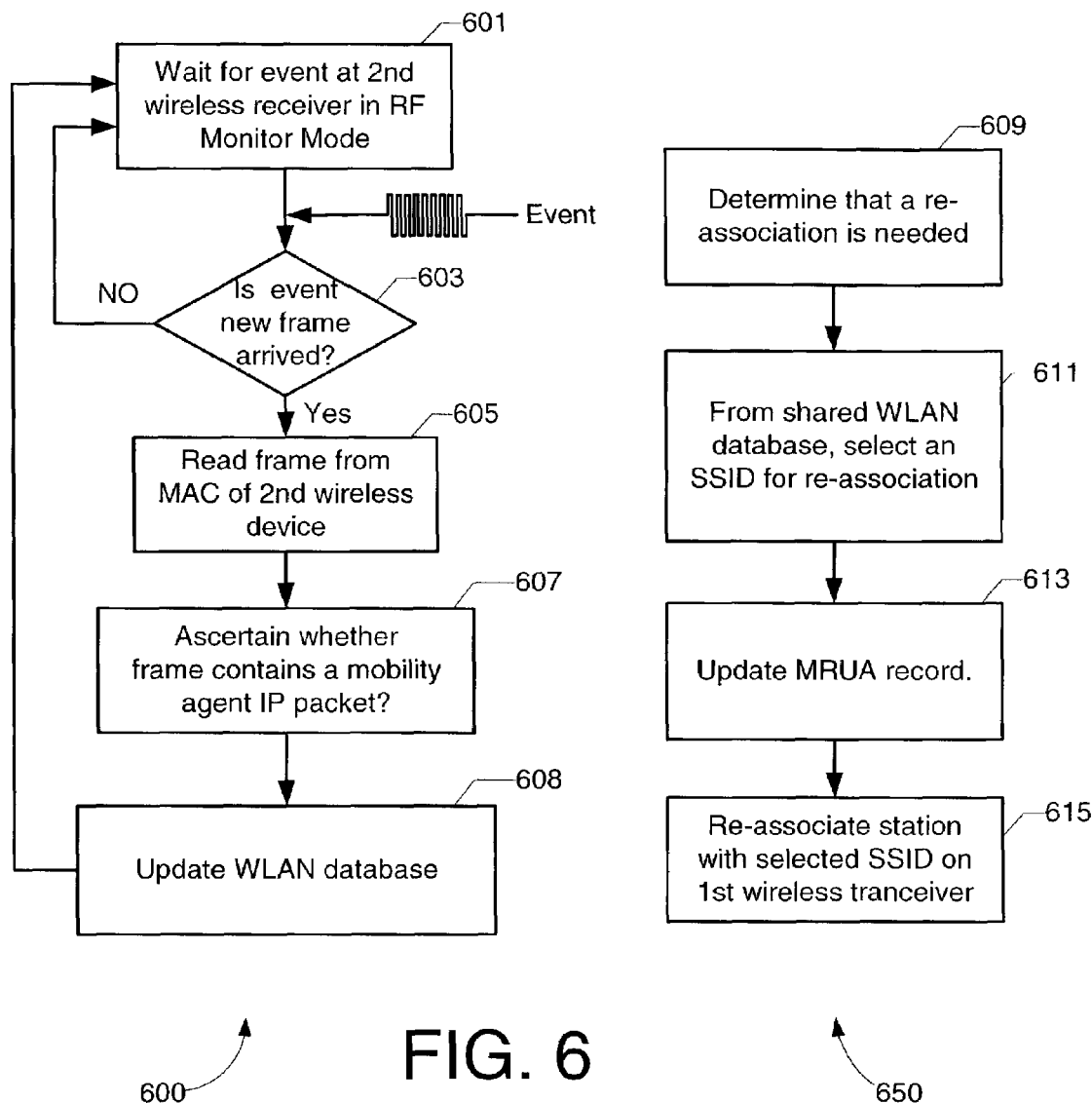
FIG. 6 shows a simplified flow chart of how the STA shown in FIG. 5 monitors L2 network traffic to ascertain whether any APs are in communication with mobility agents.

FIG. 6 is a flow chart of one embodiment of an AP updating process 600 and a re-association process 650 that uses the two wireless devices shown in FIG. 5.

The updating process 600 uses the second wireless network device assumed to be in RF monitor mode. State 601 is wait state wherein the second second wireless network device 503 waits for an event such a a new frame arriving. When an event occurs, step 603 determines if a new MAC frame has arrived, and step 605 reads the MAC frame newly arrived at the interface of the second wireless network device 503. Step 607 ascertains whether or not the frame includes mobility agent information. Step 608 updates the WLAN database using, if appropriate, information from the received frame. Step 608 in one embodiment includes ordering the records of the WLAN database according to one or more ordering criteria. The process then continues with the wait state 601 of waiting for another event such as receipt of any MAC frames from APs the STA can hear at the second wireless network device 503. Thus process 600 continually updates the WLAN database so that when re-association is needed, no time is wasted updating or re-building the WLAN database.

The updating process 608 can contain one or more of the updating, analyzing, and ordering steps described above.

For re-association, the STA is assumed to be in station mode using the first wireless network device 403. When at 609, it is determined that re-association is desired, at a step 611, the L2 re-association process 650 accesses the WLAN database, searches its records for the best candidate for association, and selects a record. After the selection of the AP, in a step 613, the process updates the MRUA record and changes the interface state for the record. The process then causes the STA to associate with the selected WLAN's AP using the first wireless network device.

Different embodiments use different criteria for the selection process 611. In one embodiment of the invention, selection process 611 includes searching the WLAN database records for an AP that is in communication with the mobility agent indicated in the IP packet in MRUA record so that re-association is with the AP that can communicate with that mobility agent. If more than one match is found, the SSID of the AP that sent a frame with the highest wireless signal quality is selected. If no matching IP addresses are found, in the one embodiment of the invention, the WLAN database is searched for alternative mobility agents. By thus retaining the same mobility agent across the re-association, the mobile nodes on the network are saved from having to establish communications with new mobility agents.

Use of an Embodiment of the Invention to Implement a Mobile Router

One use of an embodiment of the invention is implementing a mobile router by integrating a WLAN directly into a STA that is also a router using the floating interfaces described herein. When a mobile router roams into a region where several WLAN are available, the Mobile Router needs to select the one that fits its requirements better, based on configured rules and dynamic availability of resources, signal strength, channel availability, antennas, foreign agents in IPv4, access router in IPv6, and so forth. It is thus advantageous to use a blend of information available at layer 2 and layer 3 to select the proper AP or wireless network device.

Connecting a router to an access point (acting as a 802.11 bridge) via standard Ethernet port does not allow detailed monitor of radio resources from the router engine therefore limiting the capabilities of taking layer 3 decisions with layer 2 (i.e. radio) information.

Using an aspect of the invention, a router having one or more wireless network devices monitors the radio signals from APs it can hear and associates with the AP, i.e., becomes a STA to the WLAN of that AP using a blend information available at layer 2 and layer 3 to select the proper AP or wireless network device. This can occur prior to the router associating with any AP, while without benefit of the invention, gathering such layer 3 information requires first associating with an AP.

Access Control and Encryption

WLANs often include some form of access control is used. The method and apparatus described herein may be modified in a straightforward manner to account for access control.

One form of access control is Wired-Equivalent Privacy (WEP) encryption. WEP encryption prevents the contents of an L2 frames received at the station from being read unless the station is authorized. As described above (see FIG. 2A), the WLAN database still includes L2 information on each AP it can hear, such as an indication of the signal strength. However, the L3 information is only provided for those WLANs whose AP the station is authorized to associate with. In such a case, the station caries a set of encryption keys, e.g., WEP keys that enable it to decode encrypted information it the L2 frames. The method includes, for each AP, trying one of its encryption keys. If an encryption key succeeds, than the L2 frames from that AP are decrypted to examine the frames to provide the L3 information for the WLAN database. If there is no successful encryption key, an indication is made in the WLAN database that the station is not authorized to associate with that WLAN.

Other access control methods also are known. One example is called using a "captive portal." When using a captive portal, the AP allows association, but the first time a higher layer level communication occurs, e.g., the station sends an L3 packet to a foreign agent, the AP intercepts such higher level communication and requests authorization from the station prior to permitting the communication. For example, if the portal is a "for-fee" portal, the request may be for authorization to bill a previously set-up account, or for credit card information, and so forth. Embodiments of the present invention works with such a mechanism in a transparent manner because the access control mechanism takes effect only after association. For example, suppose prior to association, the station selects an access point (i.e., a WLAN) for association from the WLAN database, and suppose the selection is because the signal strength from the selected AP is good enough, and it is known that the AP is in communication with a foreign agent. Suppose that L3 at the station received an advertisement from the foreign agent via the floating interface for the selected WLAN and as a result sends a registration request to the foreign agent. An embodiment of the inventive method intercepts the L3 registration request, determines the AP with which to associate, associates with the AP, and then sends the L3 registration request to the foreign agent via the access point. The portal mechanism at the access point intercepts the registration request and responds to the station with a request for authorization. The communication proceeds, i.e., the AP sends the registration request to the foreign agent only after authorization is verified.

One embodiment of each of the processes described herein is in the form of a computer program that executes on a processing system, e.g., a one or more processors in a station in the wireless network. Thus, as will be appreciated by those skilled in the art, embodiments of the present invention may be embodied as a method, an apparatus such as a special purpose apparatus, an apparatus such as a data processing system, a wireless station, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate one or more processor of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should be appreciated that the present invention is not limited to any particular communication system, device(s), or architectures, but rather, the invention may find use in various types of communication systems.

The term data unit typically refers to a protocol data unit of information. Thus a packet, a frame, etc., each refers to a data unit.

Thus, while the present invention has been described in terms of specific embodiments, the invention is not limited to these specific embodiments. Rather, the scope of the invention is defined by the following claims and other embodiments are within the scope of the claims.

For example, the description above describes a station that includes a wireless network device. After the station associates with a WLAN, the wireless network device provides a bi-directional interface to the WLAN. Wireless network devices that have several simultaneous channels are known, and each channel is then capable of providing a bi-directional interface to a WLAN. It should be appreciated that this is essentially the same as a station that includes more than one wireless network device, so that when the description herein mentions a station that includes a plurality of wireless network devices, each capable of providing a bi-directional interface to an associated WLAN, this includes the case of the station having one or more wireless interfaces, one or more of which are capable of providing a plurality of bi-directional interfaces.

While one or more embodiments have been described for operation according to the IEEE 802.11 standard in its various forms, the invention is not restricted to the IEEE 802.11 standard, and may be applicable to other WLAN or communication standards, including, for example, bluetooth, GSM, PHS, and other cellular wireless telephony standards, wherever it is desired to recognize at L2 of a wireless station whether or not a WLAN or another station can provide mobile IP services, e.g., is in communication with one or more mobility agents. Other such applications include wireless Ethernet, Hiperlan I, Hiperlan II, and multimedia mobile access communication (MMAC) systems, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), and so forth.

Note that while the data structure that contains information on APs that the STA can hear is called the WLAN database herein, the invention is not restricted to using a traditional database, e.g., a table as the data structure is not required to be in the form of a traditional database, e.g., a table as the structure for the WLAN database. Any data structure that can maintain the required information may be used. In one embodiment, the AP data structure is a table. In another embodiment, the data structure is a list. Other data structures also are possible, as would be clear to those in the art, and the invention is not restricted to any particular form for the WLAN database.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

What is claimed is:

1. In a wireless station having a wireless network device, the device capable of providing a link-layer (L2) interface to a wireless network, a method operating at the link layer (L2) of a multi-layer network protocol, the method comprising:
   prior to the station being associated with a wireless network via the wireless network device, wirelessly receiving L2 data units transmitted from one or more wireless access point (APs) of one or more wireless networks that the station can hear; and
   gathering information about the received L2 data units, including L2 information and L3 information,
   the L3 information gathered at L2 including whether an AP is sending one or more L3 packets from one or more mobility agents,
   such that the station may associate with a wireless network that is in communication with a mobility agent.

2. A method as recited in claim 1, further comprising:
   storing information about the wireless networks that the station can hear in a database, including L3 information from the one or more mobility agents.

3. A method as recited in claim 2, wherein the one or more wireless networks whose APs transmit L2 data units conform to one of the IEEE 802.11 standards.

4. A method as recited in claim 2, wherein the information stored about each wireless network includes an identifier of the wireless network, the L3 information in the L2 data unit received from the AP of the wireless network, a time stamp of when the L2 data unit was received from the AP, and an indication of the signal strength of the L2 data unit from the AP.

5. A method as recited in claim 4,
   wherein the station includes a plurality of wireless network devices each capable of providing an interface to a wireless network, and
   wherein the information stored about each wireless network further includes an indication of which wireless network device received the L2 data unit.

6. A method as recited in claim 4, wherein the information stored about each wireless network includes an indication of any mobility information contained in any L3 information in the received L2 data unit from the AP of the wireless network.

7. A method as recited in claim 4, wherein the database further stores an indication of which wireless network information is of the most recent association to a wireless network.

8. A method as recited in claim 7, further comprising:
   periodically updating the database,
   wherein the database includes a record for each wireless network, and wherein the record of the most recently associated wireless network is not evicted from the database.

9. A method as recited in claim 4, further comprising:
   periodically updating the database.

10. A method as recited in claim 2, further comprising:
    prior to the station being associated with a wireless network, L3 accepting one or more L3 packets found in the gathering step.

11. A method as recited in claim 10, wherein the accepting by L3 is in an order according to one or more ordering criteria.

12. A method as recited in claim 2, further comprising:
    associating with a particular wireless network from where an L2 data unit was received that contains a particular L3 packet containing a mobility agent advertisement,
    such that after the associating, the wireless network interface of the station provides an interface to the particular wireless network that is in communication with the mobility agent that sent the particular L3 packet.

13. A method as recited in claim 10, wherein at least one of the L3 packets accepted by L3 is a mobility agent advertisement.

14. A method as recited in claim 13, further comprising:
    associating with a particular wireless network from where an L2 data unit containing a particular mobility agent advertisement was received,
    such that after the associating, the wireless network interface of the station provides an interface to the particular wireless network that is in communication with the mobility agent that sent the particular mobility agent advertisement.

15. A method as recited in claim 14, further comprising:
    at L3 of the station, registering with the mobility agent by exchanging L3 packets with the mobility agent.

16. A method as recited in claim 15, further comprising:
    after the associating, determining that a re-association is necessary;
    selecting for re-associating a wireless network according to one or more re-association criteria; and
    re-associating with the selected wireless network.

17. A method as recited in claim 16, wherein the re-association criteria include that the selected wireless network is in communication with the mobility agent that the station was registered with at the time of the determining that a re-association is necessary.

18. A method as recited in claim 14,
    wherein the mobility agent that sent the particular mobility agent advertisement is a Mobile IP foreign agent sending IP packets conforming to IPV4 or an access router sending IP packets conforming to IPv6, and
    wherein said station is a router that provides Mobile IP services,
    such that after association with an AP in communication with the mobility agent that sent the particular mobility agent advertisement, the station is mobile router.

19. A method as recited in claim 18, further comprising:
    after the association with an AP in communication with the mobility agent, locking the association.

20. A method as recited in claim 13, wherein the gathering information prior to associating includes:
    emulating one or more interfaces to one or more wireless networks that the station can hear, each said emulated interface thus forming a floating interface that after association can become an actual interface to a wireless network that is in communication with a mobility agent.

21. A method as recited in claim 20,
    wherein the reporting of a particular L3 mobility agent advertisement to L3 is via a floating interface to the particular wireless networks from where the L2 data unit containing the particular mobility agent advertisement was received,
    such that the particular reported L3 packet appear to L3 as if from an actual interface even though the station is not yet associated with the particular wireless network of the floating interface.

22. A method as recited in claim 21, further comprising:
    associating with the particular wireless network from where the L2 data unit containing the particular L3 mobility agent advertisement was received,
    such that after the associating, the wireless network interface of the station provides an interface to the particular wireless network that is in communication with the mobility agent that sent the particular L3 mobility agent advertisement.

23. A method as recited in claim 2, further comprising:
    selecting a wireless network for association whose AP the station can hear, the selecting according to one or more selection criteria,
    wherein at least one of the selection criteria uses at least some of the gathered information.

24. A method as recited in claim 23, wherein the selection criteria include that the L2 data unit received from the AP of the selected wireless network includes a mobility agent advertisement, such that after association, the station is in communication with a mobility agent.

25. A method as recited in claim 24, further comprising:
    associating with a particular selected wireless network from where an L2 data unit containing a particular mobility agent advertisement was received,
    such that after the associating, the wireless network interface of the station provides an interface to the particular wireless network that is in communication with the mobility agent that sent the particular mobility agent advertisement.

26. A method as recited in claim 25, further comprising:
    at L3 of the station, registering with the mobility agent by exchanging L3 packets with the mobility agent.

27. A method as recited in claim 26, further comprising:
    after the associating, determining that a re-association is necessary;
    selecting for re-associating a wireless network according to one or more re-association criteria; and
    re-associating with the selected wireless network.

28. A method as recited in claim 27, wherein the re-association criteria include that the selected wireless network is in communication with the mobility agent that the station was registered with at the time of the determining that a re-association is necessary.

29. A method as recited in claim 25,
    wherein the mobility agent that sent the particular mobility agent advertisement is a Mobile IP foreign agent sending IP packets conforming to IPV4 or an access router sending IP packets conforming to IPv6, and
    wherein said station is a router that provides Mobile IP services,
    such that after association with an AP in communication with the mobility agent that sent the particular mobility agent advertisement, the station is mobile router.

30. A method as recited in claim 2,
    wherein the station includes one or more wireless network devices each capable of providing a link-layer interface to a wireless network, and
    wherein the receiving is of L2 data units from APs that each of the wireless network devices can hear,
    the method further comprising:
        based on the gathered information, emulating at L2 one or more interfaces to one or more wireless networks whose APs the one or more wireless network devices can hear as if the station was associated to the wireless network via the device, without there necessarily being any association with any wireless network, each emulated interface thus forming a floating interface to a wireless network via a wireless network device that after association can become an actual interface to the wireless network via the wireless network device,
        L3 accepting one or more L3 packets that were in L2 data units from one or more APs via one or more of the floating interfaces as if the station was associated with the one or more APs whose L2 data units included the L3 packets.

31. A method as recited in claim 30, wherein the accepting by L3 is in an order according to one or more ordering criteria.

32. A method as recited in claim 1,
    wherein the station includes one or more wireless network devices each capable of providing a link-layer interface to a wireless network, and
    wherein the receiving is of L2 data units from APs that each of the wireless network devices can hear,
    the method further comprising:
        based on the gathered information, emulating at L2 one or more interfaces to one or more wireless networks whose APs the one or more wireless network devices can hear as if the station was associated to the wireless network via the device without there necessarily being any association with the wireless network, each emulated interface thus forming a floating interface to a wireless network via a wireless network device that after association can become an actual interface to the wireless network via the wireless network device; and
        storing information about the floating interfaces in a database.

33. A method as recited in claim 32, wherein the information stored about each floating interface includes an identifier of the wireless network of the floating interface and one or more of the L3 information in the L2 information received from the AP of the wireless network, a time stamp of when the L2 information received was received from the AP, an indication of the signal strength of the L2 information from the AP, and the state of the floating interface to the wireless network.

34. A method as recited in claim 33,
    wherein the station includes a plurality of wireless network devices each capable of providing an interface to a wireless network, and
    wherein the database further includes an indication of which wireless network device the floating interface is for.

35. A method as recited in claim 33, wherein the information stored about each floating interface includes an indication of any mobility information contained in any L3 information in the received L2 information.

36. A method as recited in claim 33, wherein the database further stores an indication of which floating interface was the most recently used association to a wireless network.

37. A method as recited in claim 36, further comprising: periodically updating the database of floating interfaces, wherein the database includes a record for each floating interface, and wherein the record of the floating interface most recently used in an association is not evicted from the wireless network database.

38. A method as recited in claim 36, further comprising: periodically updating the database of floating interfaces.

39. A method in a wireless station having a wireless network device, the method operating at the link layer (L2) of a multi-layer communication protocol that includes the link layer and a network layer (L3), the method comprising:
  prior to the station being associated with a wireless network, wirelessly receiving L2 data units transmitted from one or more wireless access point (APs) of one or more wireless networks;
  prior to the station being associated with a wireless network, analyzing said received L2 data units to identify the AP and to ascertain whether any of said L2 data units contains an L3 advertisement from a mobility agent,
  prior to the station being associated with a wireless network, if it is ascertained that an L2 data unit contains an advertisement from a mobility agent, reporting the advertisement to L3 at the station as if the station was associated with the network of the AP that transmitted the L2 data unit containing the L3 advertisement;
  in the case that L3 at the station responds to the L3 advertisement by passing to the station's L2 an L3 response to the L3 advertisement addressed to the mobility agent that sent the L3 advertisement, accepting the L3 response from L3 at the station prior to the station being associated with a wireless network, and
  after said analyzing L2-data units, reporting to L3, and accepting the L3 response, associating the station to the AP that transmitted the L2 data unit containing the L3 advertisement,
  such that the wireless station associates with an AP that is in communication with a mobility agent.

40. A method as recited in claim 39, wherein the mobility agent is a Mobile IP foreign agent sending IP packets conforming to IPV4 or an access router sending IP packets conforming to IPv6.

41. A method as recited in 40, wherein the analyzing includes:
  ascertaining whether that said L2 data unit contains an IP packet whose protocol field identifies it as an ICMP packet; and
  if it is ascertained that the L2 data unit includes an ICMP packet, verifying that the ICMP packet contains an ICMP extension with a TYPE field identifying said IP packet as a router advertisement.

42. A method as recited in 41, wherein the mobility agent is a foreign agent conforming to IPv4, and wherein the analyzing includes:
  verifying that the IP packet is an IPv4 packet, and
  if it is ascertained that the IP packet is a router advertisement, ascertaining whether the ICMP packet contains an ICMP extensions with a TYPE field identifying the router advertisement as a foreign agent advertisement.

43. A method as recited in 41, wherein the mobility agent is an access router conforming to IPv6, and wherein the analyzing includes:
  verifying that said IP packet is an IPv6 packet.

44. A method as recited in claim 39, wherein the received L2 data unit includes an indication of signal quality, wherein the reporting includes,
  selecting one or more data units that include an L3 packet, the selecting according to one or more selection criteria; and
  for each selected L2 data unit, passing the L3 packet contained in the selected L2 data unit to the network layer as if the station was associated with the AP that transmitted the selected data unit,
  the passing being according to an order based on one or more ordering criteria,
  and wherein the analyzing further includes examining the signal quality of a data unit from any identified AP.

45. A method as recited in claim 44,
  wherein the one or more selection criteria include that the mobility agent is a Mobile IP foreign agent sending IP packets conforming to IPV4 or an access router sending IP packets conforming to IPv6.

46. A method as recited in claim 45,
  wherein analyzing includes examining the signal strength of the received L2 data units, and
  wherein the one or more ordering criteria include the signal strength of the received L2 data units,
  such that L3 packets in L2 data units with higher received signal quality and that include a FA or access router mobility advertisement are reported to L3 before L3 packets with lower wireless signal quality.

47. A method as recited in claim 39,
  wherein the mobility agent is a Mobile IP foreign agent sending IP packets conforming to IPV4 or an access router sending IP packets conforming to IPv6, and
  wherein said station is a router that provides Mobile IP services,
  such that after association with an AP in communication with the mobility agent, the station is mobile router.

48. A method as recited in claim 47, further comprising:
  after association with an AP in communication with the mobility agent, locking the association.

49. In a wireless station registered with a first mobility agent and associated with a first wireless network that is in communication with the first mobility agent, the station having a first wireless network device providing a link-layer (L2) interface to the first wireless network, a method operating at the link layer (L2) of a multi-layer network protocol, a method comprising:
  determining that a re-association is necessary;
  selecting for re-associating a wireless network that the station could hear, the selecting according to one or more re-association criteria at least one of which uses L3 information, the L3 information provided in a stored database of information gathered at the station by an L2 data gathering process; and
  re-associating with the selected wireless network,
  wherein the L2 data gathering process includes:
    wirelessly receiving L2 data units transmitted from one or more wireless access point (APs) of one or more wireless networks that the station can hear while the station is not necessarily associated with any wireless network; and
    examining the received L2 data units.

50. A method as recited in claim 49, wherein the first wireless network conforms to one of the IEEE 802.11 standards.

51. A method as recited in claim 49, wherein the information stored in the database about each wireless network includes an identifier of the wireless network, the L3 information in the L2 data unit received from the AP of the wireless network, a time stamp of when the L2 data unit was received from the AP, and an indication of the signal strength of the L2 data unit from the AP.

52. A method as recited in claim 51, wherein the information stored about each wireless network includes an indication of any mobility information contained in any L3 information in the received L2 data unit.

53. A method as recited in claim 51, wherein the database further stores an indication of which wireless network information is of the most recent association to a wireless network.

54. A method as recited in claim 53, further comprising:
periodically updating the database,
wherein the database includes a record for each wireless network, and wherein the record of the most recently associated wireless network is not evicted from the database.

55. A method as recited in claim 51, further comprising:
periodically updating the database.

56. A method as recited in claim 55, wherein the updating includes:
wirelessly receiving L2 data units transmitted from one or more wireless access point (APs) of one or more wireless networks that the station can hear while the station is not associated with any wireless network used for the wirelessly receiving; and
updating the database using the wirelessly received L2 data units.

57. A method as recited in claim 56, wherein the wirelessly receiving L2 data units of the updating is via the first wireless network device.

58. A method as recited in claim 56, wherein the station further includes a second wireless network device and wherein the wirelessly receiving L2 data units of the updating is via the second wireless network device.

59. A method as recited in claim 49, wherein the mobility agent is a Mobile IP foreign agent sending IP packets conforming to IPV4 or an access router sending IP packets conforming to IPv6.

60. A method as recited in claim 52,
wherein the first mobility agent is a Mobile IP foreign agent sending IP packets conforming to IPV4 or an access router sending IP packets conforming to IPv6, and
wherein said station includes a router that provides Mobile IP services when the station is registered at L3 with the first mobility agent,
such that prior to determining a re-association is necessary and after the re-associating, the station is mobile router.

61. In a wireless station having a wireless network device, the device capable of providing a link-layer (L2) interface to a wireless network, an apparatus operating at the link layer (L2) of a multi-layer network protocol, the apparatus comprising:
means for wirelessly receiving L2 data units transmitted from one or more wireless access point (APs) of one or more wireless networks that the station can hear, the receiving being prior to the station being associated with a wireless network via the wireless network device; and
means for gathering information about the received L2 data units, including L2 information and L3 information,
the L3 information gathered at L2 including whether an AP is sending one or more L3 packets from one or more mobility agents,
such that the station may associate with a wireless network that is in communication with a mobility agent.

62. An apparatus as recited in claim 61, further comprising:
means for storing information about the wireless networks that the station can hear in a database, the information including L3 information from the one or more mobility agents.

63. An apparatus as recited in claim 62, wherein the one or more wireless networks whose APs transmit L2 data units conform to one of the IEEE 802.11 standards.

64. An apparatus as recited in claim 62, further comprising:
means for associating with a particular wireless network from where an L2 data unit was received that contains a particular L3 packet containing a mobility agent advertisement,
such that after the associating, the wireless network interface of the station provides an interface to the particular wireless network that is in communication with the mobility agent that sent the particular L3 packet.

65. An apparatus as recited in claim 62, wherein the information stored about each wireless network includes an identifier of the wireless network, the L3 information in the L2 data unit received from the AP of the wireless network, a time stamp of when the L2 data unit was received from the AP, and an indication of the signal strength of the L2 data unit from the AP.

66. An apparatus as recited in claim 65, wherein the information stored about each wireless network includes an indication of any mobility information contained in any L3 information in the received L2 data unit from the AP of the wireless network.

67. An apparatus as recited in claim 65, wherein the database further stores an indication of which wireless network information is of the most recent association to a wireless network.

68. An apparatus as recited in claim 67, further comprising
means for periodically updating the database,
wherein the database includes a record for each wireless network, and wherein the record of the most recently associated wireless network is not evicted from the database.

69. An apparatus as recited in claim 65, further comprising
means for periodically updating the database.

70. An apparatus as recited in claim 62, further comprising:
means for accepting by L3 one or more L3 packets found in the gathering step, the accepting by L3 prior to the station being associated with a wireless network.

71. An apparatus as recited in claim 70, wherein the means for accepting by L3 accepts in an order according to one or more ordering criteria.

72. An apparatus as recited in claim 70, wherein the means for accepting by L3 accepts at least one mobility agent advertisement.

73. An apparatus as recited in claim 72, further comprising:
means for associating with a particular wireless network from where an L2 data unit was received that contains a particular L3 packet containing a mobility agent advertisement,
such that after the associating, the wireless network interface of the station provides an interface to the particular wireless network that is in communication with the mobility agent that sent the particular L3 packet.

74. An apparatus as recited in claim 73, further comprising:
means for registering the station with the mobility agent by exchanging L3 packets with the mobility agent.

75. An apparatus as recited in claim 73,
wherein the mobility agent that sent the particular mobility agent advertisement is a Mobile IP foreign agent sending IP packets conforming to IPV4 or an access router sending IP packets conforming to IPv6, and
wherein said station is a router that provides Mobile IP services,
such that after association with an AP in communication with the mobility agent that sent the particular mobility agent advertisement, the station is mobile router.

76. An apparatus as recited in claim 72, wherein the means for gathering information prior to associating includes:
means for emulating one or more interfaces to one or more wireless networks that the station can hear, each said emulated interface thus forming a floating interface that after association can become an actual interface to a wireless network that is in communication with a mobility agent.

77. An apparatus as recited in claim 76,
wherein the means for reporting reports particular L3 mobility agent advertisement to L3 via a floating interface to the particular wireless networks from where the L2 data unit containing the particular mobility agent advertisement was received,
such that the particular reported L3 packet appear to L3 as if from an actual interface even though the station is not yet associated with the particular wireless network of the floating interface.

78. An apparatus as recited in claim 62, further comprising:
means for selecting a wireless network for association whose AP the station can hear, the selecting means selecting according to one or more selection criteria,
wherein at least one of the selection criteria uses at least some of the gathered information.

79. An apparatus as recited in claim 78, wherein the selection criteria include that the L2 data unit received from the AP of the selected wireless network includes a mobility agent advertisement, such that after association, the station is in communication with a mobility agent.

80. An apparatus as recited in claim 79, further comprising:
means for associating with a particular wireless network from where an L2 data unit was received that contains a particular L3 packet containing a mobility agent advertisement,
such that after the associating, the wireless network interface of the station provides an interface to the particular wireless network that is in communication with the mobility agent that sent the particular L3 packet.

81. An apparatus as recited in claim 80,
wherein the mobility agent that sent the particular mobility agent advertisement is a Mobile IP foreign agent sending IP packets conforming to IPV4 or an access router sending IP packets conforming to IPv6, and
wherein said station is a router that provides Mobile IP services,
such that after association with an AP in communication with the mobility agent that sent the particular mobility agent advertisement, the station is mobile router.

82. An apparatus as recited in claim 79, wherein the mobility agent is a Mobile IP foreign agent sending IP packets conforming to IPV4 or an access router sending IP packets conforming to IPv6.

83. An apparatus as recited in claim 72,
wherein the means for accepting by L3 accepts in an order according to one or more ordering criteria,
wherein the means for gathering information includes means for examining the signal strength of the received L2 data units, and
wherein the one or more ordering criteria include the signal strength of the received L2 data units,
such that L3 packets in L2 data units with higher received signal quality and that include a FA or access router mobility advertisement are reported to L3 before L3 packets with lower wireless signal quality.

84. In a wireless station registered with a first mobility agent and associated with a first wireless network that is in communication with the first mobility agent, the station having a first wireless network device providing a link-layer (L2) interface to the first wireless network, an apparatus operating at the link layer (L2) of a multi-layer network protocol, an apparatus comprising:
means for determining that a re-association is necessary;
means for selecting for re-associating a wireless network that the station could hear, the selecting means selecting according to one or more re-association criteria at least one of which uses L3 information, the L3 information provided in a stored database of information gathered at the station by an L2 data gathering process; and
means for re-associating with the selected wireless network,
wherein the L2 data gathering process includes:
wirelessly receiving L2 data units transmitted from one or more wireless access point (APs) of one or more wireless networks that the station can hear while the station is not necessarily associated with any wireless network; and
examining the received L2 data units.

85. An apparatus as recited in claim 84, wherein the first wireless network conforms to one of the IEEE 802.11 standards.

86. An apparatus as recited in claim 84, wherein the information stored in the database about each wireless network includes an identifier of the wireless network, the L3 information in the L2 data unit received from the AP of the wireless network, a time stamp of when the L2 data unit was received from the AP, and an indication of the signal strength of the L2 data unit from the AP.

87. An apparatus as recited in claim 86, wherein the information stored about each wireless network includes an indication of any mobility information contained in any L3 information in the received L2 data unit.

88. An apparatus as recited in claim 86, wherein the database further stores an indication of which wireless network information is of the most recent association to a wireless network.

89. An apparatus as recited in claim 88, further comprising:
means for periodically updating the database,
wherein the database includes a record for each wireless network, and wherein the record of the most recently associated wireless network is not evicted from the database.

90. An apparatus as recited in claim 86, further comprising:
means for periodically updating the database.

91. An apparatus as recited in claim 90, wherein the means for updating includes:
means for wirelessly receiving L2 data units transmitted from one or more wireless access point (APs) of one or more wireless networks that the station can hear while the station is not associated with any wireless network used for the wirelessly receiving; and
means for updating the database using the wirelessly received L2 data units.

92. An apparatus as recited in claim 91, wherein the means for wirelessly receiving receives L2 data units via the first wireless network device.

93. An apparatus as recited in claim 91, wherein the station further includes a second wireless network device and wherein the means for wirelessly receiving receives L2 data units via the second wireless network device.

94. An apparatus as recited in claim 84, wherein the mobility agent is a Mobile IP foreign agent sending IP packets conforming to IPV4 or an access router sending IP packets conforming to IPv6.

95. An apparatus as recited in claim 87,
wherein the first mobility agent is a Mobile IP foreign agent sending IP packets conforming to IPV4 or an access router sending IP packets conforming to IPv6, and
wherein the station includes a router that provides Mobile IP services when the station registered at L3 with the first mobility agent,
such that prior to determining a re-association is necessary and after the re-associating, the station is mobile router.

96. A wireless station comprising:
a wireless network device capable of providing a link-layer (L2) interface to a wireless network, the wireless network device to wirelessly receive L2 data units transmitted from one or more wireless access point (APs) of one or more wireless networks that the station can hear, the receiving being prior to the station being associated with a wireless network via the wireless network device; and
a processor coupled to the wireless network device to gather information about the received L2 data units, including L2 information and L3 information;
the L3 information gathered at L2 including whether an AP is sending one or more L3 packets from one or more mobility agents,
such that the station may associate with a wireless network that is in communication with a mobility agent.

97. A wireless station as recited in claim 96, further comprising:
a memory coupled to the processor, the memory to store information about the wireless networks that the station can hear in a database, the information including L3 information from the one or more mobility agents.

98. A wireless station as recited in claim 97, wherein the processor is programmed associate with a particular wireless network from where an L2 data unit was received that contains a particular L3 packet containing a mobility agent advertisement, such that after the associating, the wireless network interface of the station provides an interface to the particular wireless network that is in communication with the mobility agent that sent the particular L3 packet.

99. A wireless station as recited in claim 97, wherein the one or more wireless networks whose APs transmit L2 data units conform to one of the IEEE 802.11 standards.

100. A wireless station as recited in claim 97, wherein the information stored about each wireless network includes an identifier of the wireless network, the L3 information in the L2 data unit received from the AP of the wireless network, a time stamp of when the L2 data unit was received from the AP, and an indication of the signal strength of the L2 data unit from the AP.

101. A wireless station as recited in claim 100, wherein the information stored about each wireless network includes an indication of any mobility information contained in any L3 information in the received L2 data unit from the AP of the wireless network.

102. A wireless station as recited in claim 100, wherein the database further stores an indication of which wireless network information is of the most recent association to a wireless network.

103. A wireless station as recited in claim 102,
wherein the processor is programmed to periodically update the database, and
wherein the database includes a record for each wireless network, and wherein the record of the most recently associated wireless network is not evicted from the database.

104. A wireless station as recited in claim 100 wherein the processor is programmed to periodically update the database.

105. wireless station as recited in claim 97, further comprising:
an L2 to L3 interface coupled to the processor for an L3 process running on the processor to accept one or more L3 packets found in the gathering, the accepting by L3 prior to the station being associated with a wireless network.

106. A wireless station as recited in claim 105, wherein processor is programmed to accept at L3 at least one mobility agent advertisement via the L2 to L3 interface.

107. A wireless station as recited in claim 106, wherein processor is further programmed to associate with a particular wireless network from where an L2 data unit was received that contains a particular L3 packet containing a mobility agent advertisement,
such that after the associating, the wireless network interface of the station provides an interface to the particular wireless network that is in communication with the mobility agent that sent the particular L3 packet.

108. A wireless station as recited in claim 107,
wherein the mobility agent that sent the particular mobility agent advertisement is a Mobile IP foreign agent sending IP packets conforming to IPV4 or an access router sending IP packets conforming to IPv6, and
wherein said station is a router that provides Mobile IP services,
such that after association with an AP in communication with the mobility agent that sent the particular mobility agent advertisement, the station is mobile router.

* * * * *